(12) United States Patent
Peliks et al.

(10) Patent No.: US 7,213,547 B2
(45) Date of Patent: May 8, 2007

(54) VALVE

(75) Inventors: Robert Bilgor Peliks, San Francisco, CA (US); Nam P. Suh, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 97 days.

(21) Appl. No.: 11/011,679

(22) Filed: Dec. 14, 2004

(65) Prior Publication Data
US 2006/0124087 A1 Jun. 15, 2006

(51) Int. Cl.
*F01L 7/02* (2006.01)
*F16K 7/18* (2006.01)

(52) U.S. Cl. .............. 123/80 R; 123/190.1; 123/190.2; 123/190.14; 137/625.28; 251/901

(58) Field of Classification Search .............. 123/80 R, 123/80 BA, 80 BB, 80 D, 80 DA, 190.1, 123/190.4, 190.7, 190.8, 190.9, 190.11, 190.2, 123/190.14, 190.15, 190.17; 137/625.28; 251/901
See application file for complete search history.

(56) References Cited

U.S. PATENT DOCUMENTS

| | | | |
|---|---|---|---|
| 880,601 A | 3/1908 | Thompson | |
| 2,784,740 A | * 3/1957 | Stageberg | ............. 137/625.44 |
| 3,254,674 A | 6/1966 | Leask | |
| 3,407,744 A | 10/1968 | Slimm | |
| 3,719,097 A | * 3/1973 | Wilkes | ...................... 74/100.2 |
| 3,771,563 A | * 11/1973 | Hayner | .................. 137/625.28 |
| 3,773,077 A | * 11/1973 | Barnebey | ............... 137/625.28 |
| 3,882,898 A | 5/1975 | Pickle | |
| 3,898,022 A | 8/1975 | Lutz | |
| 3,924,980 A | 12/1975 | Gordon | |
| 3,954,251 A | 5/1976 | Callahan et al. | |
| 4,217,811 A | 8/1980 | Dzioba et al. | |
| 4,224,797 A | 9/1980 | Kelly | |
| 4,297,086 A | 10/1981 | McGowan | |
| 4,332,392 A | 6/1982 | Boehringer | |
| 4,431,161 A | 2/1984 | Miller et al. | |

(Continued)

FOREIGN PATENT DOCUMENTS

DE 24 20 138 A1 11/1975

(Continued)

OTHER PUBLICATIONS

Pennington, R., "Modular Rotary Valve RTO/RCO Performance on a Particleboard Dryer," product description from Durr Environmental, Mar. 2001, 5 pages.

(Continued)

*Primary Examiner*—Noah P. Kamen
(74) *Attorney, Agent, or Firm*—Wolf, Greenfield & Sacks, P.C.

(57) ABSTRACT

A valve is constructed to strike a balance between providing relatively high sealing yet low friction as components of the valve move. The valve includes a port and an actuator movable relative to the port. A member is disposed between the port and the actuator. The actuator acts on the member so that it can intermittently seal the port as it moves. The member and the actuator have a substantially low friction interface, whereas the seal member and the port have a substantially high sealing interface. The valve can be used in an engine, such as a rotary valve in an internal combustion engine.

72 Claims, 20 Drawing Sheets

U.S. PATENT DOCUMENTS

| | | | |
|---|---|---|---|
| 4,444,161 A | 4/1984 | Williams | |
| 4,540,019 A | 9/1985 | Owoc et al. | |
| 4,573,496 A | 3/1986 | Richard | |
| 4,582,084 A | 4/1986 | Gyurovits | |
| 4,753,443 A | 6/1988 | Nicholson | |
| 4,782,741 A | 11/1988 | Sigmon | |
| 4,854,837 A | 8/1989 | Cordray | |
| 4,869,478 A | 9/1989 | Bouhours et al. | |
| 4,976,232 A | 12/1990 | Coates | |
| 4,977,869 A * | 12/1990 | Fayard | 123/188.8 |
| 4,989,558 A | 2/1991 | Coates | |
| 5,005,543 A | 4/1991 | Triguero | |
| 5,029,517 A | 7/1991 | Sigmon | |
| 5,154,147 A | 10/1992 | Muroki | |
| 5,207,774 A | 5/1993 | Wolfe et al. | |
| 5,361,739 A | 11/1994 | Coates | |
| 5,402,821 A | 4/1995 | Harstad | |
| 5,676,432 A | 10/1997 | Moon | |
| 5,704,396 A | 1/1998 | Brillant et al. | |
| 5,752,643 A | 5/1998 | MacVicar et al. | |
| 5,771,849 A | 6/1998 | Hamy | |
| 5,842,680 A | 12/1998 | Bustamanet et al. | |
| 5,941,206 A | 8/1999 | Smith | |
| 6,027,098 A | 2/2000 | Nevrekar | |
| 6,213,141 B1 | 4/2001 | Eggleston | |
| 6,308,677 B1 | 10/2001 | Bohach et al. | |
| 6,321,699 B1 | 11/2001 | Britton | |
| 6,332,600 B2 | 12/2001 | Eggleston | |
| 6,481,699 B1 | 11/2002 | Aihara et al. | |
| 6,666,458 B2 | 12/2003 | Coates | |
| 2001/0005007 A1 | 6/2001 | Eggleston | |
| 2002/0017761 A1 | 2/2002 | Dubose | |
| 2003/0011137 A1 | 1/2003 | Dubose | |
| 2003/0116206 A1 | 6/2003 | Hartshorne et al. | |

FOREIGN PATENT DOCUMENTS

| | | |
|---|---|---|
| DE | 24 60 164 A1 | 6/1976 |
| DE | 25 46 212 A1 | 4/1977 |
| DE | 27 16 776 A1 | 10/1978 |
| DE | 31 34 875 A1 | 3/1983 |
| DE | 3134875 A1 | 3/1983 |
| DE | 33 33 421 A1 | 4/1985 |
| DE | 35 00 917 A1 | 12/1985 |
| DE | 35 27 618 A1 | 5/1986 |
| DE | 42 07 318 A1 | 9/1993 |
| DE | 43 18 926 A1 | 12/1994 |
| DE | 297 05 540 U1 | 6/1997 |
| DE | 199 31 129 A1 | 1/2000 |
| DE | 100 39 840 A1 | 8/2000 |
| DE | 100 07 835 A1 | 8/2001 |
| EP | 0 471 329 A2 | 2/1992 |
| EP | 1 243 824 A1 | 9/2002 |
| FR | 2 183 427 A1 | 5/1972 |
| FR | 72.16916 | 1/1974 |
| FR | 2 638 203 A1 | 4/1990 |
| FR | 2 795 152 A1 | 12/2000 |
| GB | 2 211 549 A | 7/1989 |
| JP | 8-200426 | 8/1996 |
| JP | 9-68013 | 3/1997 |
| JP | 9-68014 | 3/1997 |
| JP | 9-68015 | 3/1997 |
| JP | 9-303121 | 11/1997 |
| JP | 2003083170 A | 3/2003 |
| JP | 2003097394 A | 4/2003 |
| RU | 2005214 C1 | 12/1993 |
| SU | 732590 | 5/1980 |
| SU | 732590 A1 | 5/1980 |
| SU | 949269 | 8/1982 |
| SU | 1774111 A1 | 11/1992 |
| WO | WO 93/10382 A1 | 5/1993 |
| WO | WO 93/25802 A1 | 12/1993 |
| WO | WO 94/18454 A1 | 8/1994 |
| WO | WO 96/41950 A1 | 12/1996 |
| WO | WO 01/90578 A1 | 11/2001 |
| WO | WO 200288533 A1 | 11/2002 |

OTHER PUBLICATIONS

"New Valve Seats for Better Sealing," *Mechanical Engineering*, Jul. 1995, vol. 117, No. 7, p. 40.

Excell, J., "Valves in a spin," *Design Engineering*, ed. by George Coupe, Jan. 9, 2004, pp. 27-29.

"Integra R," product description, *Automotive Engineering*, Dec. 1995, 2 pages.

Shibano, K. et al., "A Newly Developed Variable Valving Mechanism with Low-Mechanical Friction," 920451, pp. 1-7.

Yasuda, M. et al., "A New 1.6-Liter Twin-Cam 16-Valve Nissan Engine," 910677, pp. 1120-1131.

Abstract of Masato et al., "New 2.5 liter In-line 6 Engine with High Output and Good Fuel Economy," *Toyota Tech Rev*, 1997, vol. 47, No. 1, pp. 18-23.

Abstract of Katsuhiro et al., "The Development of the VH41DE Engine for the New Cima," *Nissan Technical Review*, 1991, No. 30, pp. 17-24.

Abstract of Shoji, "An advance of equipment and apparatus which use petroleum products. New system and mechanism of a 4-wheel gasoline engine," *Petrotech*, 1990, vol. 13, No. 8, pp. 655-658.

Abstract of Takumi et al., "A Study of Rotary Valve for Reciprocating Piston Engine," *Research Reports of Kanagawa Institute of Technology. Part B. Science and Technolog*, 1998, No. 22, pp. 31-38.

Abstract of Takumi et al., "Study on the columnar Rotary Valve. 4th Report. A new design of columnar type of Rotary Valve and evaluation of its basic performance characteristics," *Jidosha Gijutsukai Gakujutsu Koenkai Maezurishu*, 1993, No. 936, pp. 9-12.

Abstract of Takumi et al., "A Study on Cylindrical Rotary Valve. 3rd Report: Improvement of Volumetric Efficiency and Measurement of Gas Leakage and Valve Driving Loss," *Transaction of the Society of Automotive Engineers of Japan*, 1993, vol. 24, No. 4, pp. 13-17.

Abstract of Kazunobu et al., "Study of 4 Cycle Engine using a Variable Piston Stroke," *Nippon Kikai Gakkai Kansai Shibu Teiji Sokai Koenkai Koen Ronbunshu*, 1993, vol. 68, No. Pt 2, pp. 224-226.

Abstract of Gale Group, "Engineer and machinist in Minnetonka have been building a better engine," *Star Tribune*, Minneapolis, MN, p. D1, Feb. 24, 1994.

* cited by examiner

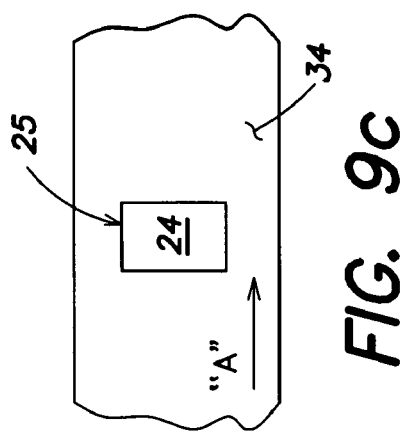
FIG. 9c
FIG. 9b
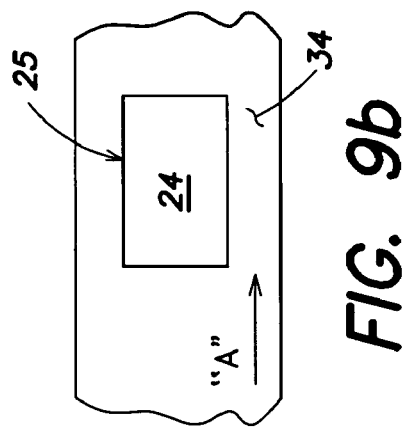
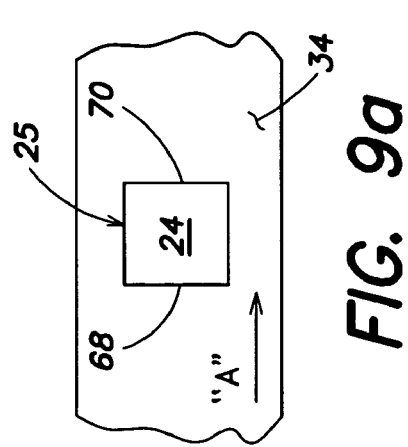
FIG. 9a
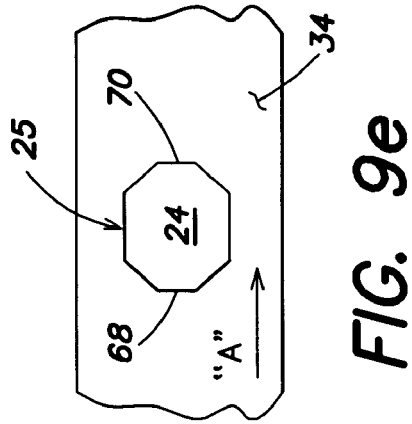
FIG. 9e
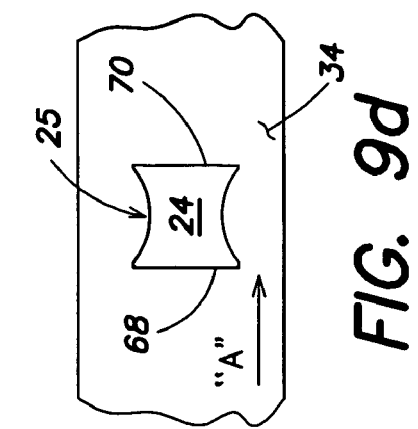
FIG. 9d

VALVE

BACKGROUND OF INVENTION

1. Field of Invention

The invention relates to valves and more particularly to rotary valves.

2. Discussion of Related Art

Valves are used to control the flow of fluids, such as air or water, or solids, such as powders, and typically include a seal component that covers a flow port through the valve. To provide an adequate seal, valve designers strive to create a relatively tight fit or seal between the seal component and the port, and this may be accomplished with relatively large biasing forces acting on the seal component. However, such a high biasing force must be overcome when it is desired to actuate the valve, resulting in a relatively high energy cost.

Many common valve applications, such as poppet valves used in internal combustion engines, could benefit from a reduction in efficiency losses. Efforts have been made to employ rotary valves in engines, which require less energy to actuate than poppet valves and offer additional advantages, such as allowing the engine to operate at a higher rpm, allowing for the use of variable valve timing, and providing fewer parts. However, these rotary valves have not gained widespread use, in part because the operating efficiency gain over conventional poppet valves is not significant, thermal expansion is difficult to manage, cost is relatively high, and acceptance by automotive engine designers has been low. Improvements to valves and rotary valves in particular have largely focused on material selection that only slightly reduced these deficiencies including frictional losses while maintaining or improving the sealing characteristics.

SUMMARY OF INVENTION

According to one aspect, a valve is provided. The valve includes a housing having a port, an actuator movable relative to the housing, and a flexible member disposed between the housing and the actuator. The actuator acts on the flexible member so that the flexible member intermittently seals the port as the actuator moves.

According to another aspect, a rotary valve is provided. The valve includes a housing having a port, a rotor rotatable relative to the housing, and a seal member disposed between the housing and the rotor and adapted to seal the port. The seal member and the rotor have a substantially low friction interface. The seal member and the port have a substantially high sealing interface.

According to yet another aspect, a rotary valve is provided. The valve includes a housing having a port. The port defines a valve seat. The valve further includes a rotor rotatable relative to the housing, a member disposed between the housing and the rotor, a first interface defined by the valve seat and the member, and a second interface defined by the member and the rotor. The first interface provides a seal to intermittently seal the port as the rotor rotates and the second interface provides a low friction surface to increase rotatability of the rotor relative to the housing.

According to still another aspect, a rotary valve is provided. The valve includes a housing having a cone-shaped surface, a port extending through the cone-shaped surface and a rotor rotatable relative to the housing and shaped to cooperate with the cone-shaped surface of the housing. The valve further includes a sealing/sliding interface disposed between the housing and the rotor and adapted to conform to the cone-shaped surface of the housing. The sealing/sliding interface intermittently seals the port as the rotor slidingly rotates over the interface.

According to further aspect, an engine is provided. The engine includes a cylinder block having at least one cylinder, a cylinder head coupled to the cylinder block and coving an open end of the at least one cylinder. The cylinder head has a port communicating with the cylinder. The engine further includes a rotary valve cooperating with the port to intermittently seal the port. The rotary valve having a rotor rotatable relative to the port, and a member disposed between the rotor and the port. The rotor acting on the member to intermittently seal the port as the rotor rotates.

According to still another aspect, a valve is provided. The rotary valve comprises a housing having a housing surface and a port extending to the housing surface and a valve seat on the housing surface disposed about the port. The rotary valve also comprises a flexible membrane constructed and arranged to maintain rolling contact with the housing surface, such that the valve is closed when a portion of the flexible membrane is rolled into contact with the valve seat and such that the valve is opened when the portion of the flexible member is rolled from the valve seat. The rotary valve also comprises an actuator adapted to move the flexible member in rolling contact with the housing surface.

According to still another aspect, a valve is provided. The valve comprises a housing having a port, an actuator movable relative to the housing, and a flexible member having a hole. The flexible member is disposed between the housing and the actuator. The actuator acts on the flexible member to move the hole in the flexible member into and out of alignment with the port of the housing so that the flexible member intermittently seals the port as the actuator moves.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF DRAWINGS

The accompanying drawings are not intended to be drawn to scale. In the drawings, similar features are represented by like reference numerals. For clarity, not every component is labeled in every drawing. In the drawings:

FIGS. 9a–9e are illustrative schematics of different port constructions that may be used to control the rate of flow through a rotary valve;

DETAILED DESCRIPTION

A valve is constructed to provide both high sealing capabilities and low energy operation as the valve moves between open and closed positions. In one aspect, the valve has a port and a flexible sealing member adapted to seal the port. Various mechanisms, such as an actuator, which may be in the form of a rotor for use in rotary valves, can move the flexible member to selectively close and open the valve. In particular, the mechanisms can move the flexible member in rolling or overlying contact with a surface of the housing between open and closed positions to open or close the port. The interface between the port and the flexible member can be optimized for sealing, instead of reduced friction. Additionally, other interfaces within the valve, such as the interface between the flexible sealing member and an actuator used to bring the flexible sealing member into a position to seal the port, may be optimized for low energy operation, such as low friction sliding, instead of sealing. The valve can be used in an engine, such as a rotary valve in an internal combustion engine.

The valve described herein may be constructed in any suitable fashion and many illustrative embodiments of the valve include a housing with a port, an actuator, and a flexible sealing member disposed between the housing and the actuator. The combination of these components provides a valve that can be selectively opened or closed by moving the actuator relative to the housing. A discontinuity in the actuator receives a portion of the flexible member, which can be aligned with the port to open the valve, and moved away from the port to close the valve. When open, a continuous flow path through the valve is provided to allow the passage of fluid, such as air or water. When closed, the valve blocks the passage of fluid through the valve, either completely or partially as may be desired for particular applications.

Illustrative embodiments of the valve benefit from having a sealing interface that does not operate in a sliding mode, but rather operates by rolling motion, as will be discussed in greater detail.

Figure 1A:
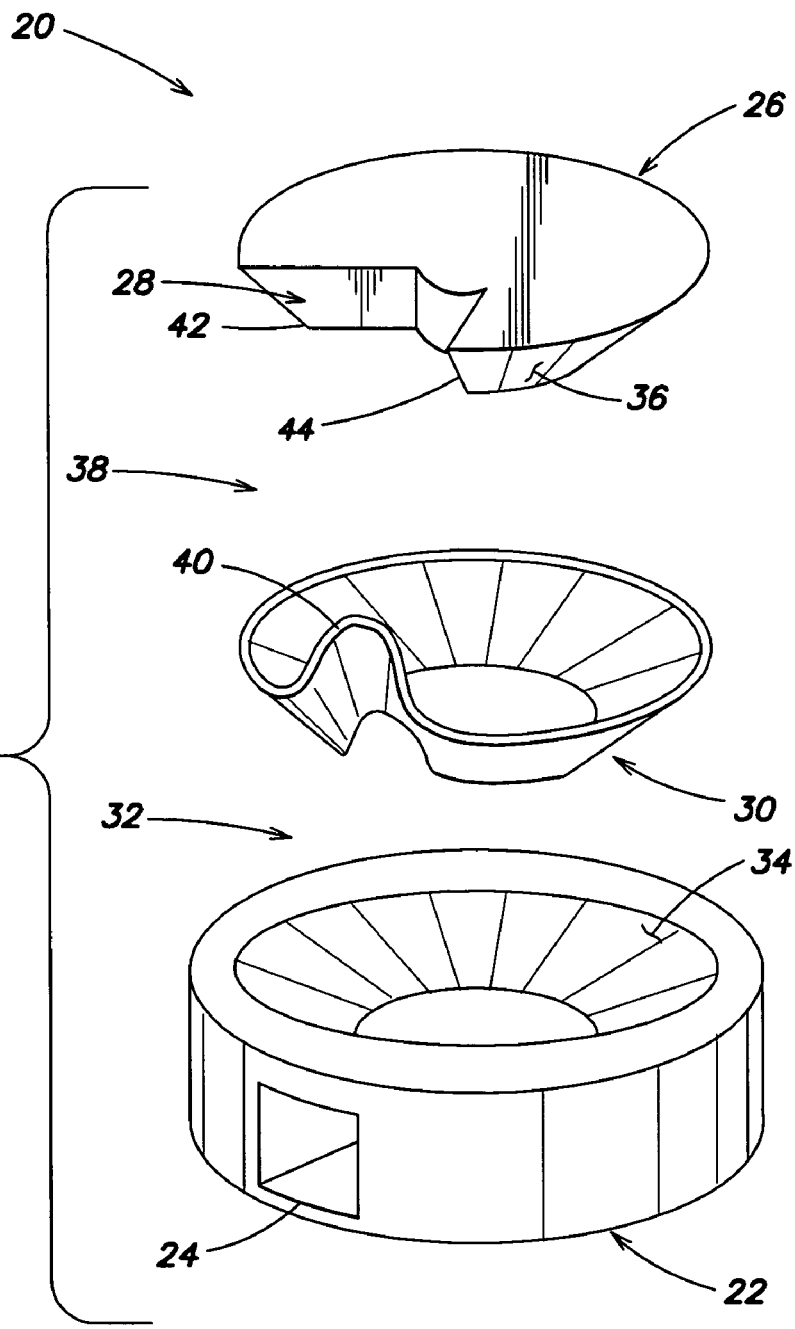
FIG. 1a is an illustrative exploded assembly view of a cone-shaped rotary valve having a housing, a rotor, and a flexible member that cooperate to intermittently open and close a port.
Figure 1B:
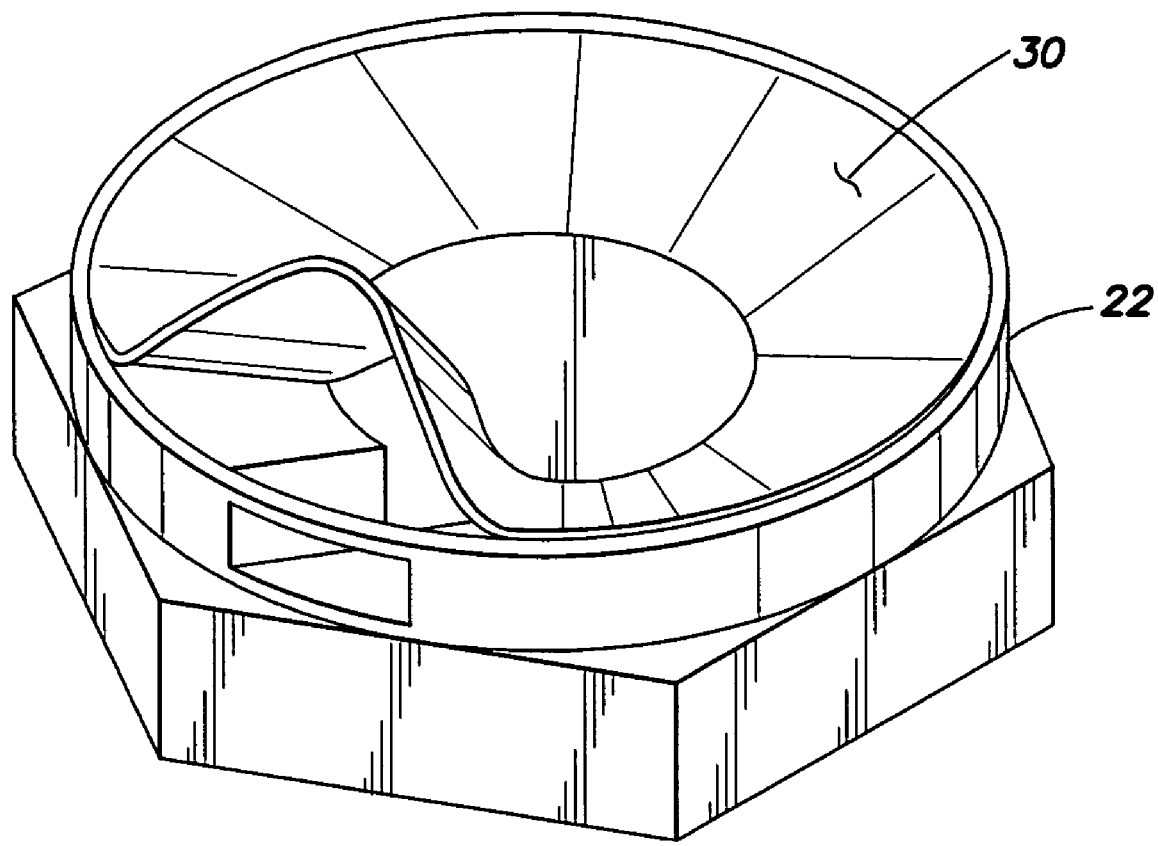
FIG. 1b is an illustrative assembled view of FIG. 1a, with the rotor removed for clarity.

In one embodiment, the valve is construed as a rotary valve. However, the present invention is not limited in this respect, as the valve can be constructed as a linear valve, as will be explained below. In the embodiment shown in FIGS. 1a and 1b, a rotary valve 20 includes a housing 22 with a port 24, a rotor 26, with a discontinuity 28, and a flexible sealing member 30 disposed between the housing and the rotor. As shown by the embodiment of FIGS. 1a and 1b, the rotor and the housing 22 each have a surface that faces the other. That is, the housing has a rotor-facing surface and the rotor has a housing-facing surface 36. A flexible member is disposed between the rotor and the housing to create a sealing interface with the housing, and a low friction sliding interface 38 with the rotor. In this regard, the interface between the flexible member and the housing can be optimized for sealing, while the interface between the flexible member and the rotor can be optimized for energy efficient operation. Thus, while rolling motion occurs between the housing and the flexible member, sliding motion occurs between the flexible member and the rotor.

Figure 2C:
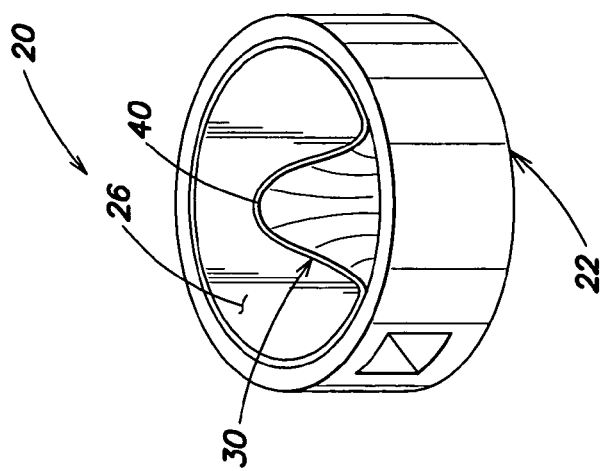
FIGS. 2a–2c illustrate the movement of a rotor and a flexible member of one valve as the port is opened and subsequently closed.
Figure 2B:
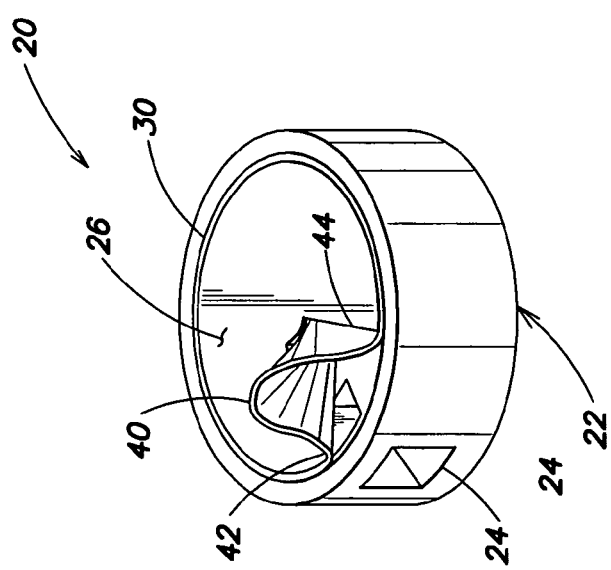
Figure 2A:
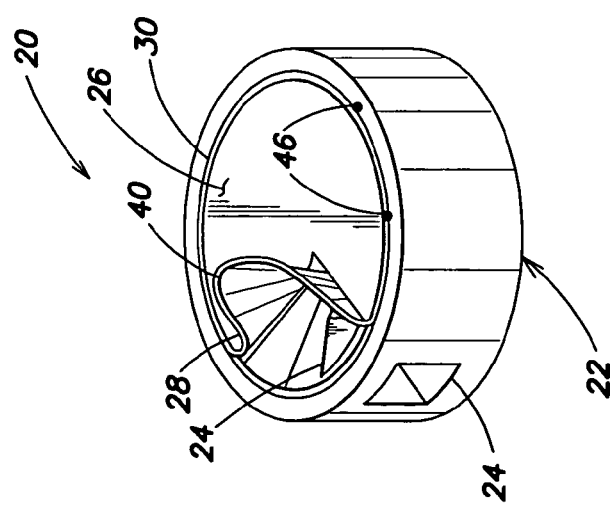

As show in FIGS. 1a and 1b, the flexible sealing member 30 is sized such that it does not conform completely to the surface 34 of the housing. In the embodiment of FIGS. 1a and 1b, the surface area of the flexible member is larger than the corresponding surface area of the housing and thus leaves a portion of the flexible member that does not contact the surface 34, but rather creates a buckle 40, when the flexible member is forced to conform to the housing surface. The buckle can exist in different positions of the flexible member, and can be moved, like a wave, about the surface of the housing to bring the flexible member locally out of contact and then back into contact with the housing surface to intermittently seal the port. In other embodiments, like that shown in FIG. 4, the flexible member may have a smaller surface area than the corresponding housing surface which again leaves a portion of the flexible member that does not contact a surface. FIGS. 2a–2c depict the motion of a buckle as it moves in rolling contact about the surface 34 of a housing 22 in one illustrative embodiment of a rotary valve. FIG. 2a shows a valve having a rotor 26 to move the flexible member in rolling contact about the housing surface. To accomplish this, the rotor has a discontinuity 28 aligned with a buckle. As the rotor rotates, the flexible member 30 slides with respect to the rotor, but the buckle of the flexible member remains disposed within the discontinuity. That is, portions of the flexible member slide into one end 42 of the discontinuity as other portions of the flexible member also slide out of the opposite end 44 of the discontinuity to maintain the buckle. In this regard, the buckle can be moved, like a wave, over the port 24 to open the valve, as show in FIG. 2a. The buckle can also be moved from the port 24 to bring the flexible member 30 into contact with the periphery of the port to close the valve. FIG. 2b shows the buckle as it is being moved away from the port to begin closing the valve. Here the flexible member slides with respect to the rotor as the rotor is rotated, but moves in rolling contact with respect to the housing 22 surface. FIG. 2c depicts the valve after the buckle has moved away from the port. Here, the flexible member is in contact with the valve seat to block fluid flow through the port, thus closing the valve.

Although the flexible member is not sliding with respect to the housing 22, the position of the flexible member can change or translate with respect to the housing 22 during operation, as the buckle moves with respect to the housing surface. For example, FIG. 2a shows the position of a reference point 46 on the flexible sealing member both before and after a single, complete revolution of the valve.

This helps illustrate how each point on the flexible member is lifted into the buckle 40, translated a distance through the discontinuity 28, and then placed back into contact with the housing. The distance traveled is approximately equal to the difference in the circumference of the flexible member and the housing surface measured at the same radius. In this manner, the flexible member 30 and the housing 22 are in rolling contact, or are to be considered effectively substantially stationary with respect to one another, even though they may move relative to one another as described above. It is to be appreciated that some micro scale sliding may also occur between the flexible member and the housing while it is still considered to be in rolling contact, as used herein.

As described above, embodiments of the rotary valve 20 may operate with the rotor 26 moving through complete rotations to effect opening and closing of the valve. However, the valve may operate in other manners as well. For instance, the rotor may reciprocate between an open position and a closed position by rotating back and forth through less than complete rotations. Additionally, the movement of the rotor, whether reciprocating or moving continuously in one direction, may be periodic or irregular. Still, in some embodiments, the valve may be held for a time in a stationary position with the valve open, closed, or at some point in between as may be desired in a particular application.

As described above, many embodiments of the present invention include a housing 22 having a port 24 and a rotor 26 with a discontinuity or other feature 28 that can be aligned with the port to open the valve 20. The flexible member can both seal the port and also provide a sliding surface for the rotor. As used herein, it is to be understood that "housing" refers to a component of the valve having a port that can be sealed by a flexible member. As is also to be understood, "rotor" refers to a component of the valve that moves the flexible member into and/or out of alignment with the port. Although the rotor and housing 22 are discussed and depicted herein in particular embodiments, it is to be understood by those of skill that the rotor and/or the housing may be designed in other ways to satisfy the needs of particular applications without departing from the present invention. For example, although the rotor is shown in many embodiments as the component that rotates, in some embodiments, the rotor 26 may remain stationary while the housing 22 rotates but maintains rolling contact with the flexible member.

Figure 3A:
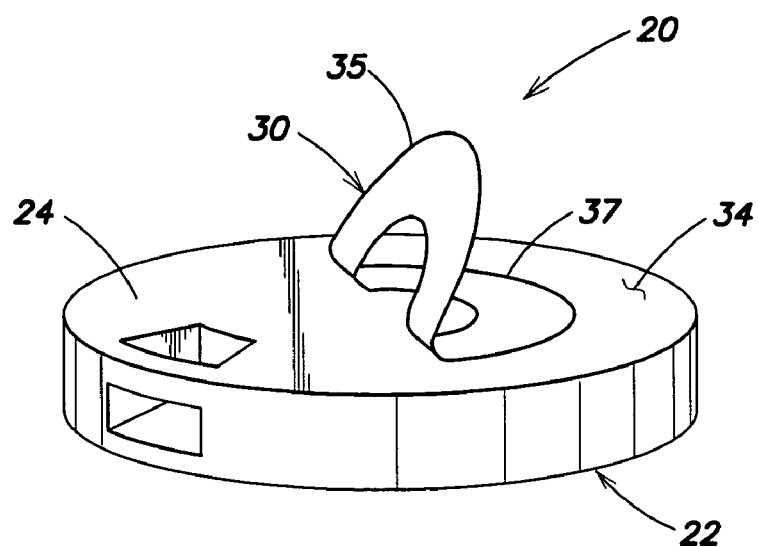
FIGS. 3a–3b are illustrative perspective views of alternative disk-shaped valves, each having a housing and a flexible member that intermittently opens and closes a port.

Aspects of the present invention can be incorporated into different configurations of rotary valves, and not just valves having a cone-shaped interface as shown in FIGS. 1–2. For example, FIG. 3a shows an embodiment of a disk-shaped rotary valve 20 where the housing has a substantially flat surface 34 that engages a flexible member 30. In this embodiment, the rotor is held in a bent configuration with a rotor, not shown. As the rotor rotates, the upstanding portion 35 of the flexible sealing member can roll down into engagement with the housing to cover the port. Further rotation causes the portion that is now lying down over the port to once again roll up to its upstanding configuration, once again opening the port. In one embodiment, the amount of the flexible member that remains in contact with the housing (namely lying down portion 37) is less than 180 degrees of the total 360 degrees of the flexible member and in one embodiment is approximately 170 degrees, although other configurations may be employed, as the present invention is not limited in this respect.

Figure 3B:
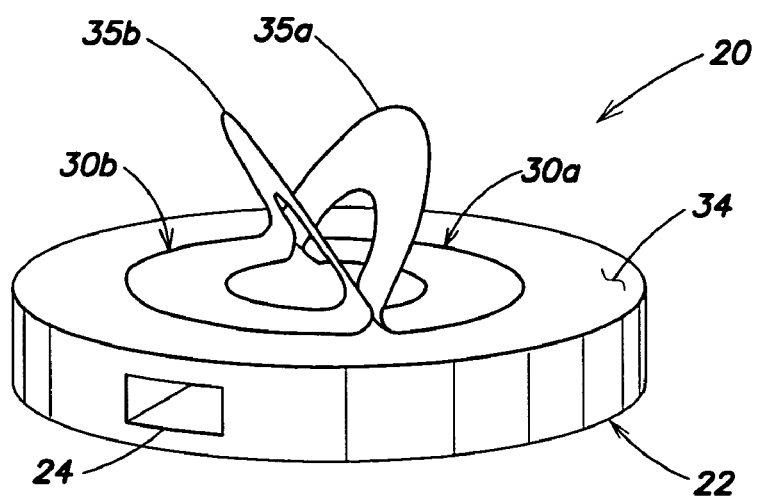

In another embodiment, shown in FIG. 3b, two flexible sealing members 30a and 30b may be used. This configuration may be advantageous when it is desirable to seal the port for a longer duration, to seal more than one port, or for other reasons. In one embodiment, the port is open for only approximately 80 degrees of rotation. In this regard, the total port opening is approximately equal to the size of the port plus the size of the buckle opening. In this embodiment, the port is 60 degrees wide and the buckle is 20 degrees, such that the port is open for 80 degrees. It should be appreciated that other opening amounts may be employed, as the present invention is not limited in this respect.

In still another version of the disk-shaped rotary valve (not shown), the flexible member may be shaped so as to be curved in a radial direction, like a tape measure, which may be accomplished by stretching and/or bending the flexible member or attaching concentric rings having differing angles relative to a plane to form a shaped flexible member. This may provide certain advantages, such as reducing the amount of wobbling of the flexible member.

Some embodiments, particularly those that have a flexible sealing member with a buckle that reciprocates to open and close the valve, may have a housing shaped like a portion of a cone or disk instead of a completely formed cone or disk.

Figure 4:
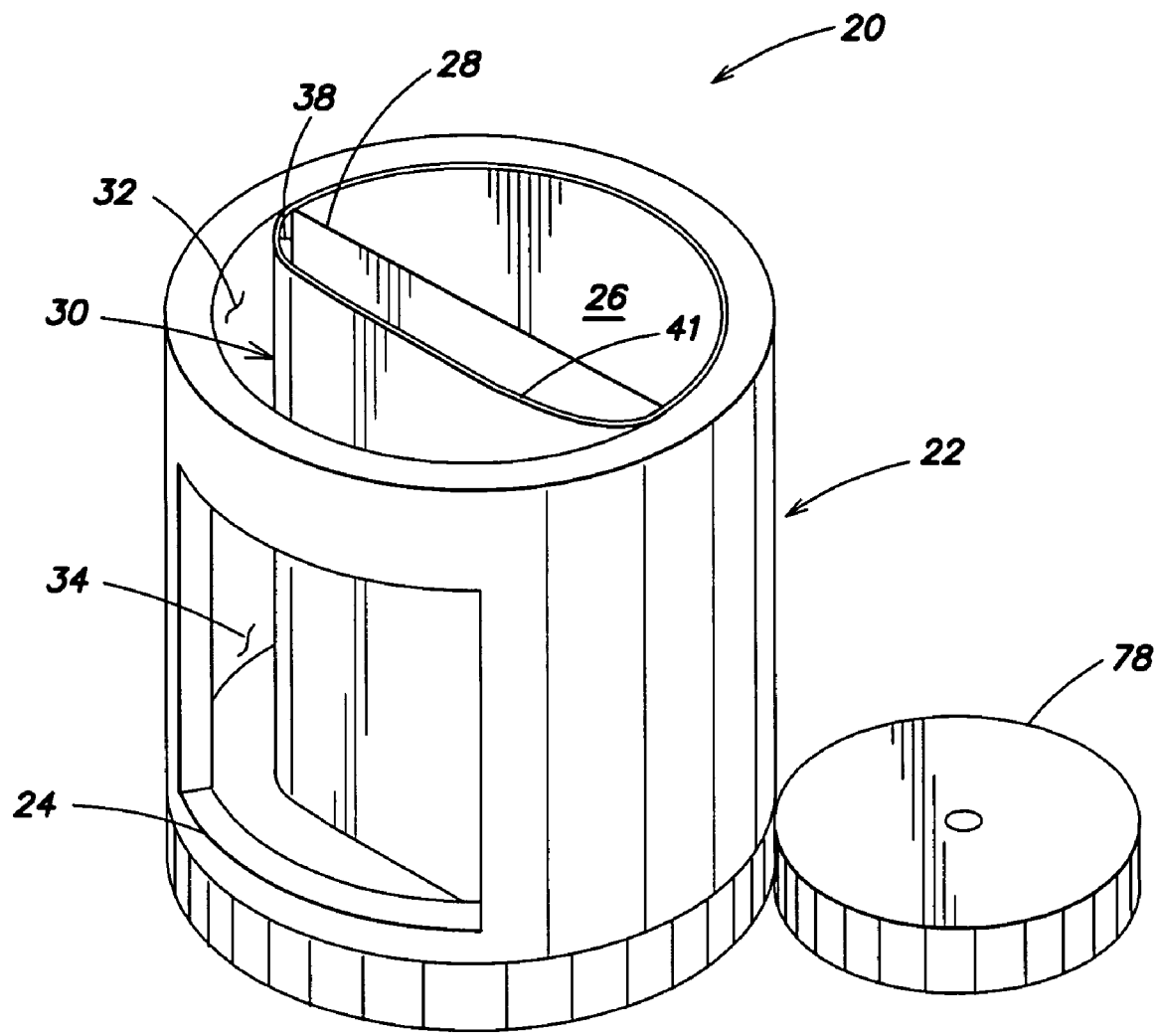
FIG. 4 is an illustrative perspective view of a cylinder-shaped valve having a housing with a gear drive, a rotor, and a flexible member that cooperate to intermittently open and close a port.

Other embodiments include cylindrically-shaped rotary valves, as depicted by FIG. 4. In one such embodiment, the housing may be shaped substantially like a cylinder. The rotor 26 is formed in a manner similar to a cylinder that is split lengthwise in half, to create a discontinuity. A flexible member 30 is shaped to generally conform to the rotor to thereby create a portion 41, which may be referred to as a buckle, that does not contact the housing. As with the other embodiments, the flexible member is in rolling contact with the housing and in sliding contact with the rotor, such that portion 41 moves along the flexible member, like a wave, so as to intermittently seal the port.

As those of skill will appreciate, there exist other configurations of rotary valves that may incorporate aspects of the present invention, such as spherical valves, as the present invention is not limited to any one configuration. In a spherical valve, the flexible member may be shaped so as to be curved in a radical direction, like a tape measure.

As mentioned above, the valve may also be configured as a linear valve. In this embodiment, the valve operates under the same principle, namely where an actuator moves a portion (e.g., buckle) formed on a flexible member over a port, except that the motion is linear. This may be considered as if the rotating valve described above with reference to FIGS. 1a and 1b is split radially and opened to form a straight line rather than a circle. Of course, because the valve is configured along a straight line, the actuator must reciprocate, rather than optionally move in one direction, as in the case of a rotary valve. Other suitable configurations for the valve may be employed as the present invention is not limited in this respect.

The flexible member 30 may be formed of various different materials, and in many embodiments is formed of material commonly used as shim stock or spring steel. The flexible member may be formed of or treated (e.g., coated) with a low friction material. Portions of the flexible member may be so formed (e.g., the portion facing the rotor) whereas other portions (e.g., the portion facing the housing) can include coatings, or be formed of a relatively higher friction material to enhance sealing. By way of example, the flexible member may be made of ceramics, plastics, kevlar, steel, titanium, other metals and the like. In choosing a material and specific arrangement for the flexible member, factors to consider include, but are not limited to the material used to form the rotor, the material used to form the housing, the fluid that will pass through the valve, the duty cycle of the valve, and the wear properties, fatigue limit and magnetic properties of the material being employed.

With regard to fatigue properties, the flexible member may be exposed to fully reversed bending cycles as it is periodically buckled away from and back toward the housing during operation. To prevent cyclic fatigue, some embodiments can be designed such that the maximum stress in the flexible member is below the fatigue limit for the material used to make the flexible member.

To help limit the stress in the flexible member, valves can be configured such that the bend angle is minimized. Additionally, the thickness of the flexible member may be reduced such that strain, and consequently stress in the flexible member is also minimized. In some embodiments, edges of the discontinuity in the rotor that are in contact with the buckle may be shaped and sized to maintain the bend angle below a desired value. In some instances, a rotor 26 may be designed such that surfaces of the discontinuity maintain continual sliding contact with the buckle 40 as it passes through the discontinuity to more closely control the bending that the flexible member 30 undergoes.

As described above, illustrative embodiments of valves have a sliding interface 38 that can be optimized to provide low friction movement. This can reduce the amount of energy required to rotate the rotor between open and closed positions, and thus reduce the energy required to operate the valve. Typically, the sliding interface 38 is designed with lower friction than the sealing interface 32 between the housing and the flexible member. In this manner, when the rotor is moved, relatively more sliding will occur at the lower friction interface (that is, the sliding interface) whereas relatively less or no sliding will occur at the sealing interface 32.

Low friction sliding may be achieved in different ways. In some embodiments, the rotor has a low friction coating applied to the housing-facing surface. Examples of such coatings include, but are not limited to ceramic coatings and plastic coatings. In some embodiments, the rotor itself is made of a low friction material, such as ceramic or plastic material (e.g., TEFLON). In others, the sliding surface of the flexible member has a low coefficient of friction. In other embodiments, the entire flexible member is made of a material that has a low coefficient of friction. Still, in other embodiments roller bearings, or the like, may be disposed between the rotor and the flexible member to facilitate low friction motion.

As may be appreciated, the integrity of the seal in a rotary valve may be affected by numerous factors. By way of example, surface conformity may affect sealing and achieving conformity may be more difficult, as manufacturing conforming opposing surfaces in some constructions of rotary valves, like cone-shaped or sphere-shaped valves, may be difficult. Still, some embodiments of valves may be used in harsh environments, such as those exposed to high temperatures that might cause differential thermal expansion of components in a valve. These situations may cause irregularities in sealing surfaces of a valve, which can, in turn, cause leak paths through a valve. Some illustrative embodiments of valves may have features that reduce these undesirable effects, as described in greater detail below.

Figure 5A:
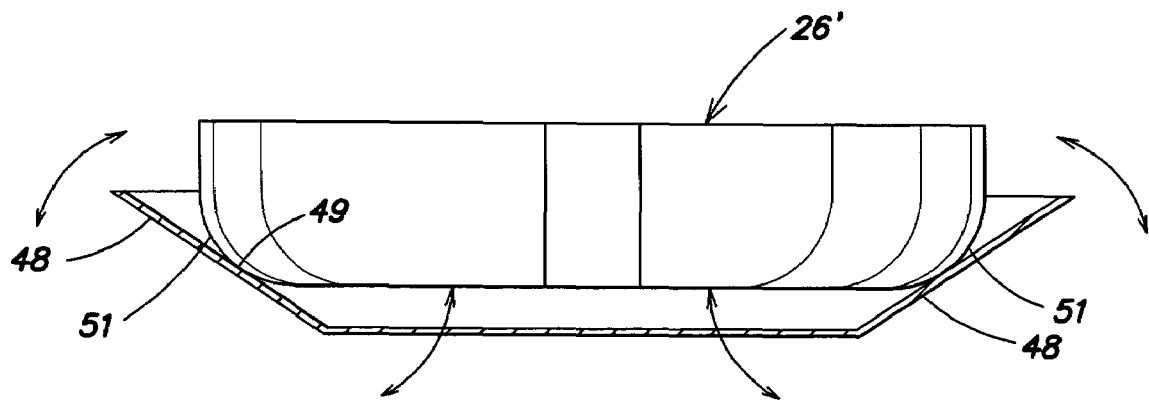
FIGS. 5a–5b illustrates a rotor with a pressure plate to conform to an opposed surface of the valve.
Figure 5B:
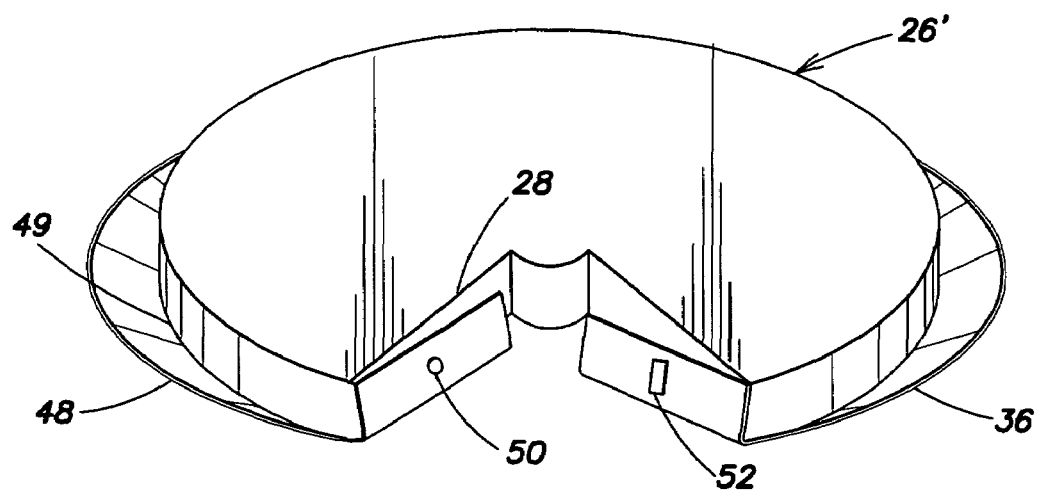

In one embodiment, the surface of a rotor may employ portions capable of moving to conform to the surface 34 of the housing. By way of example, FIGS. 5a and 5b are schematic diagrams of a hinged plate 48 that can be attached to a rotor 26. The hinged plate can rotate about a pivot point 50 to allow the plate to conform to the housing surface. The surface of a rotor may include one or more of such hinged plates or other moving portions to provide improved conformance with the housing surface.

As illustrated, the rotor has a radiused edge 49. The pressure plate has a pivotable surface that can rotate about the radiused edge at two connection points 50, 52 and that can also slide at one of the connection points 52. Together, the radiused-edge rotor and pressure plate cooperate to simulate the cone-shaped rotor described above. In pivoting, the pressure plate distributes pressure between the rotor and the flexible member more evenly. In turn, the pressure between the flexible member and housing is also distributed more evenly than might otherwise be possible. Although the conformable surface shown in FIGS. 5a and 5b is disposed on the rotor, it is to be appreciated that the housing of a rotary valve, such as the valve seat itself may also have a conformable surface to accomplish similar effects, as is described herein in greater detail.

Figure 6A:
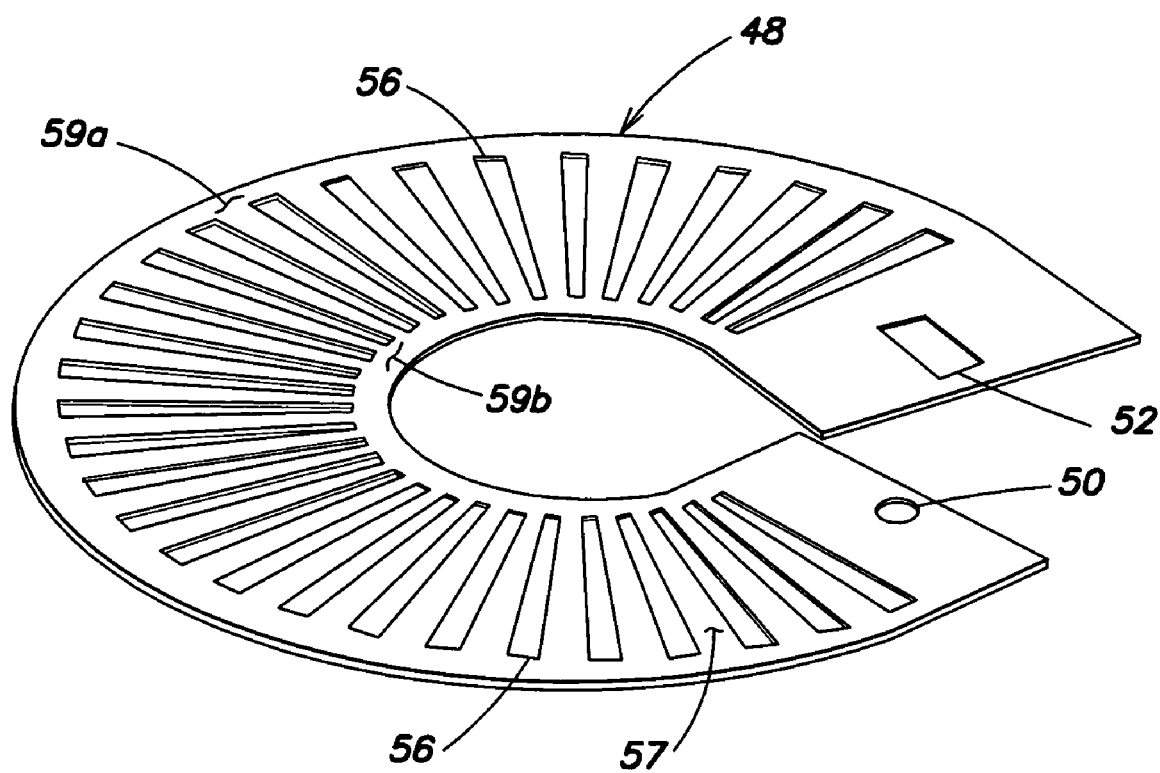
FIGS. 6a–6d show alternative pressure plates rotor having multiple portions adapted to conform to an opposed surface.
Figure 6D:
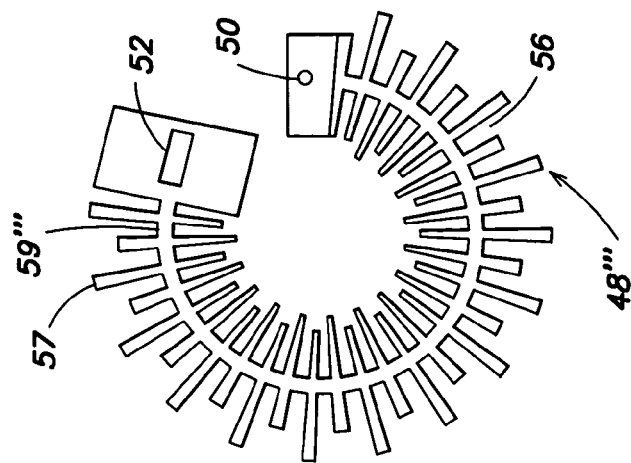

In one illustrative embodiment, the pressure plate 48 includes features that allow it to conform more readily to an opposed surface. As shown by the pressure plate in FIG. 6a (shown separated from the rotor), such features may include one or more cutouts or slits 56 that result in beams 57 joined by bridges 59a and 59b. The cutouts enable portions of the pressure plate to flex more readily with respect to another. In this manner, the pressure between the rotor and the housing can be more evenly distributed to further improve sealing of the valve. Also, the cutouts or slits 56 allow the plate to be compliant enough to allow it to change its shape (e.g., angle) yet remain stiff enough to avoid unwanted bending. The cutouts may also be employed to provide an undulated surface and/or particle traps.

Figure 6C:
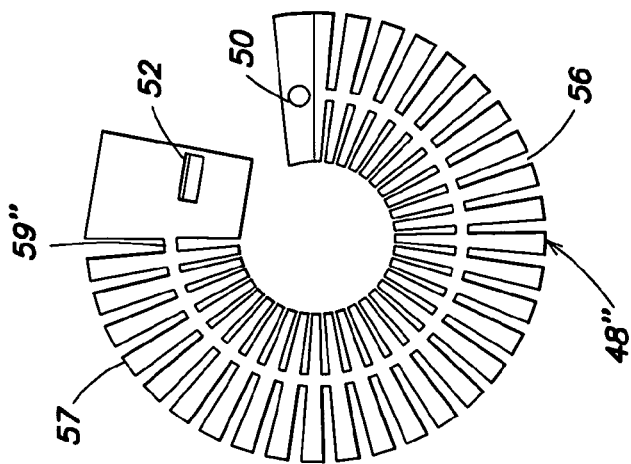
Figure 6B:
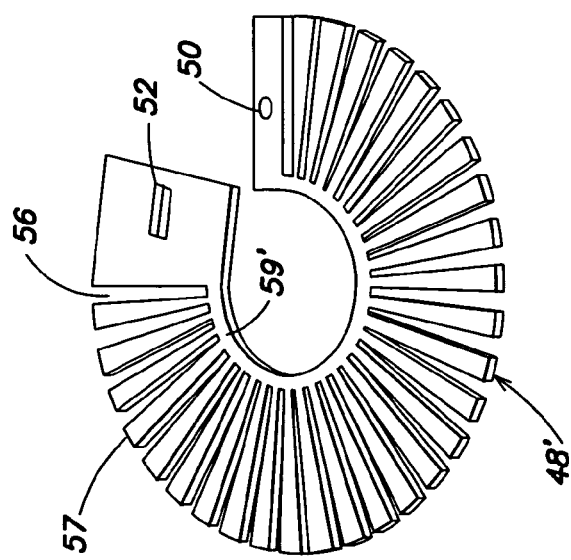

In other embodiments, as shown in FIGS. 6b and 6c, the plates 48' and 48" provide relatively high compliance circumferentially, with high stiffness radially. In the embodiment shown in FIG. 6b, the beams 57 are joined by a single edge bridge 59' located at the central area. Alternatively, the bridge 59' may be formed at the outer circumference. In the embodiment shown in FIG. 6c, the beams 57 are joined by a centrally located bridge 59". In some circumstances, however, misalignment between the beam 57 and the housing and/or rotor can occur as contact might only occur at the ends of the beams, rather than along the length of the beam. Thus, in some embodiments, it may be desirable to provide well-distributed point contacts rather than line contact for each beam. Thus, as shown in FIG. 6c, plate 48''' includes a plurality of offset beams 57 joined by a centrally located bridge 59'''. It should be appreciated that any suitable beam arrangement may be employed, as the present invention is not limited in this respect.

Further, multiple stacked pressure plates may be employed and in some embodiments, the stacked plates may have different diameters and arranged in a pyramid-like fashion.

The cutouts/slits 56 can be formed in any manner (such as by stamping, machining, and the like) and can include any number as the present invention is not limited in this respect. Pressure plates according to various embodiments of the present invention can be manufactured from materials similar to those used to form the flexible member 30. Such materials include metal foils, metal plates, plastic, and the like, provided they have the requisite thickness. Additionally, like other surfaces of the rotary valve, the pressure plate can be coated with materials that reduce its coefficient of friction, particularly when the pressure plate is applied to the rotor. Alternately, in cases where the pressure plate or/another conformable surface is associated with the housing, such as a part of a valve seat, surface treatments may be used to increase the coefficient of friction to help hold the flexible member in rolling contact or to otherwise improve sealing.

Figure 7:
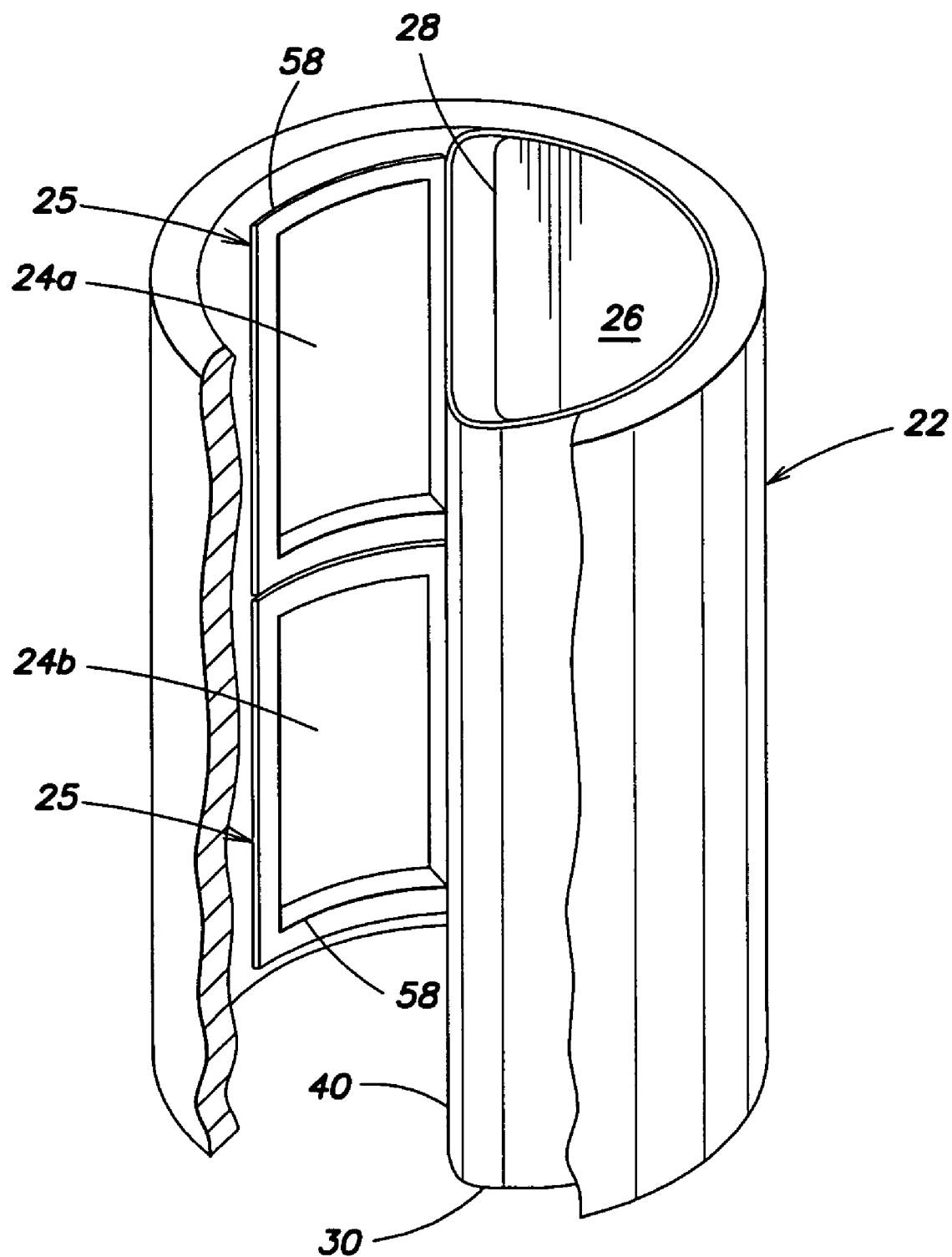
FIG. 7 illustrates a valve having a housing with a first and a second port, and a raised valve seat around each port.

As mentioned herein, embodiments of the rotary valve are adapted to selectively open and close a fluid path through the valve 20. In some embodiments, such as the one illustrated in FIG. 1, the path extends from a port 24 in the housing 22, through a buckle 40 within the discontinuity 28 in the rotor 26, and then out of the valve. However, it is also to be appreciated that the discontinuity may open communication between two ports in the housing. By way of example, FIG. 7 shows a housing that has a first and second port 24a, 24b that are placed in fluid communication with one another when the discontinuity is aligned in the open position.

In some illustrative embodiments, ports may have features that further improve sealing with the flexible member. In one such illustrative embodiment, as shown in FIG. 7, the port can include a valve seat 25 with a raised edge 58 that mates with the flexible member. The raised edge can reduce friction, reduce wear and/or create higher pressure around the perimeter of the port (i.e., the valve seat) when the valve is in the closed position, resulting in improved seal integrity.

To allow components of a valve to be replaced when worn or when the valve is being configured for a different application, some embodiments may include removable valve seats 25 and/or flexible members. By way of example, a raised valve seat 58 may be subjected to greater wear than other components of the valve and may thus need to be replaced before other valve components, such as the rotor and/or housing. To improve the serviceability of the valve, some embodiments may allow the valve seat and/or flexible member to be removed and replaced without also replacing the housing or rotor. This may be particularly useful when the housing includes other components of a larger system. By way of example, the cylinder head of an engine may serve as a housing to multiple rotary valves while containing other components of an engine. In such an application, it may be more effective to service valves in the engine by replacing worn valve seats and/or flexible member instead of replacing an entire cylinder head.

In some embodiments, valve seats 25 may be made of a material that promotes sealing with the flexible member. By way of example, a raised valve seat may be made of a material that is softer than the surrounding portions of the housing. Such a raised valve seat may better conform to the flexible member as the flexible member is forced against the housing, thereby providing a better seal. Still, in other embodiments, the material surrounding a valve seat may be more compliant than the valve seat, such that when the flexible member is pressed against the seat, a higher pressure interface will exist about the perimeter of the port, thus providing a better seal.

As may be appreciated, various factors may cause the interface between a valve seat and the flexible member to change, such as wear and temperature gradients within the valve, to name a few. Embodiments of the valve can further improve sealing between the housing 22 and flexible member 30 with a valve seat 25 that maintains consistent contact with the flexible member. That is, factors such as the contact area and the pressure distribution between the valve seat and the flexible member may be more consistent over time or across the valve seat at any given time.

Figure 8:
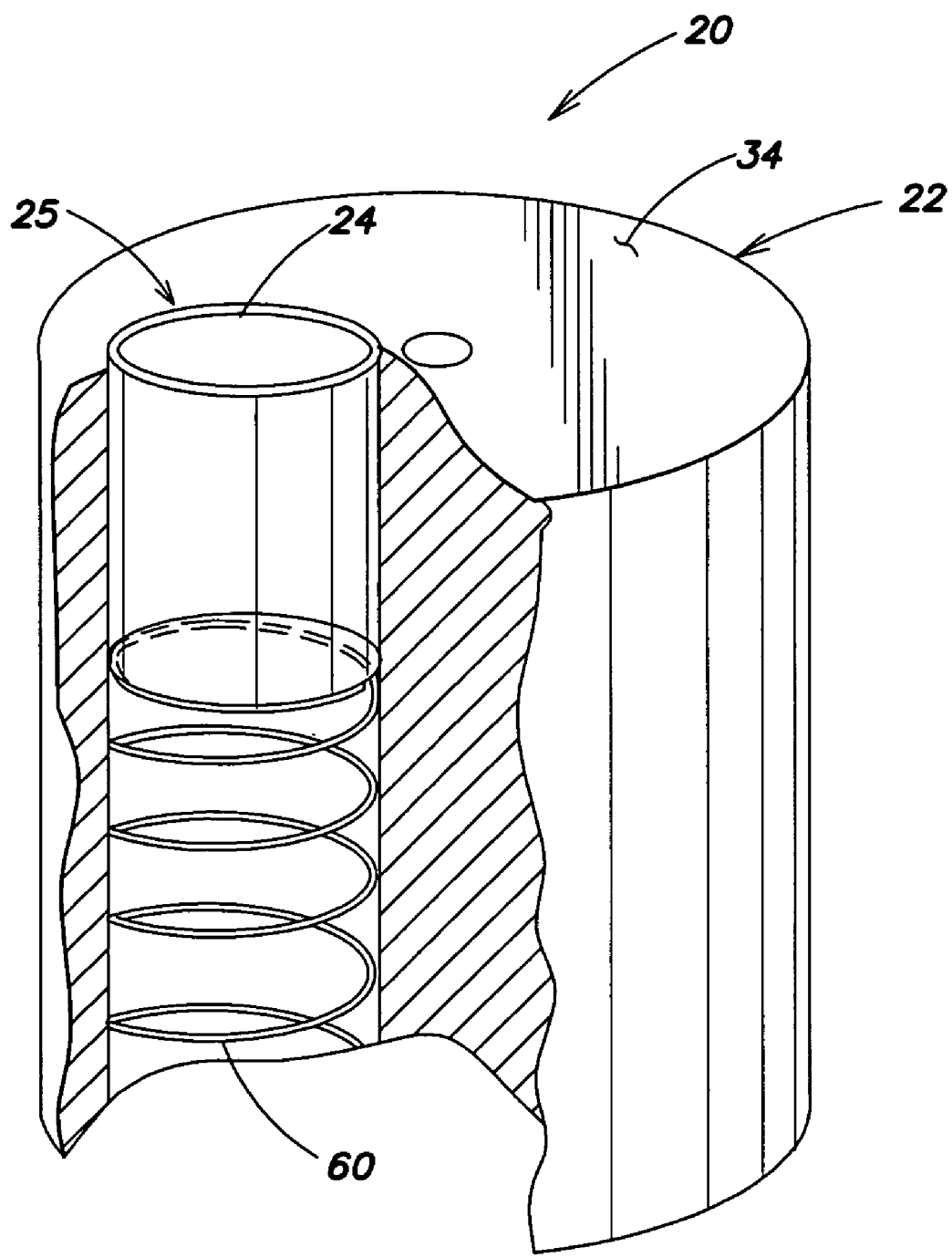
FIG. 8 illustrates a housing having a free-floating valve seat.

FIG. 8 shows one embodiment of a valve with features to provide consistent contact between a valve seat and flexible member. In particular, the valve has a valve seat that can float to provide such consistent contact. As the floating valve seat wears or deforms under these conditions, it can move upwards toward the flexible member to maintain a consistent sealing interface. In the illustrated embodiment, a resilient member 60 biases the floating valve toward the flexible member to help maintain consistent interface characteristics discussed above. Still, in other embodiments, a fluid pressure within the port may force the insert against the flexible member. In this regard, the contact pressure or force acting on the flexible member by the floating valve seat can advantageously follow the same pressure cycle or trace being applied in the system within which the valve operates. For example, when the rotary valve is employed in an engine, the combustion pressure can reach 20 atmospheres, which can act on the valve seat to aid in sealing against the flexible member. However, as the pressure drops, e.g., after combustion, less contact force or pressure will be applied by the valve seat on the flexible member. Thus, the contact pressure acting on the valve seat and in turn on the flexible member follows the pressure cycle in the engine. The overall friction in the system will therefore be decreased, resulting in an overall more efficient operation. Stop features may be incorporated to prevent a floating insert from moving to far in either direction, such as by extending into the buckle of the flexible member when the valve is in the open position.

Embodiments of the present invention may include features to control the rate of fluid flow through the rotary valve. As may be appreciated by those of skill, valves can pass through an infinite number of partially open transition positions as they are being opened or closed. In some applications, the rate of fluid flow through the valve during the transition positions may be important. Fluid flow rates can be established by the design of the valve passage, and particularly the cross sectional area of the valve passage in the direction perpendicular to the fluid flow. That is, a restriction placed within the valve, such as at the port can be used to slow the flow rate. Similarly, the cross section area of the port during the transition positions can be designed to control the fluid flow rate as the valve opens and closes.

Figure 10:
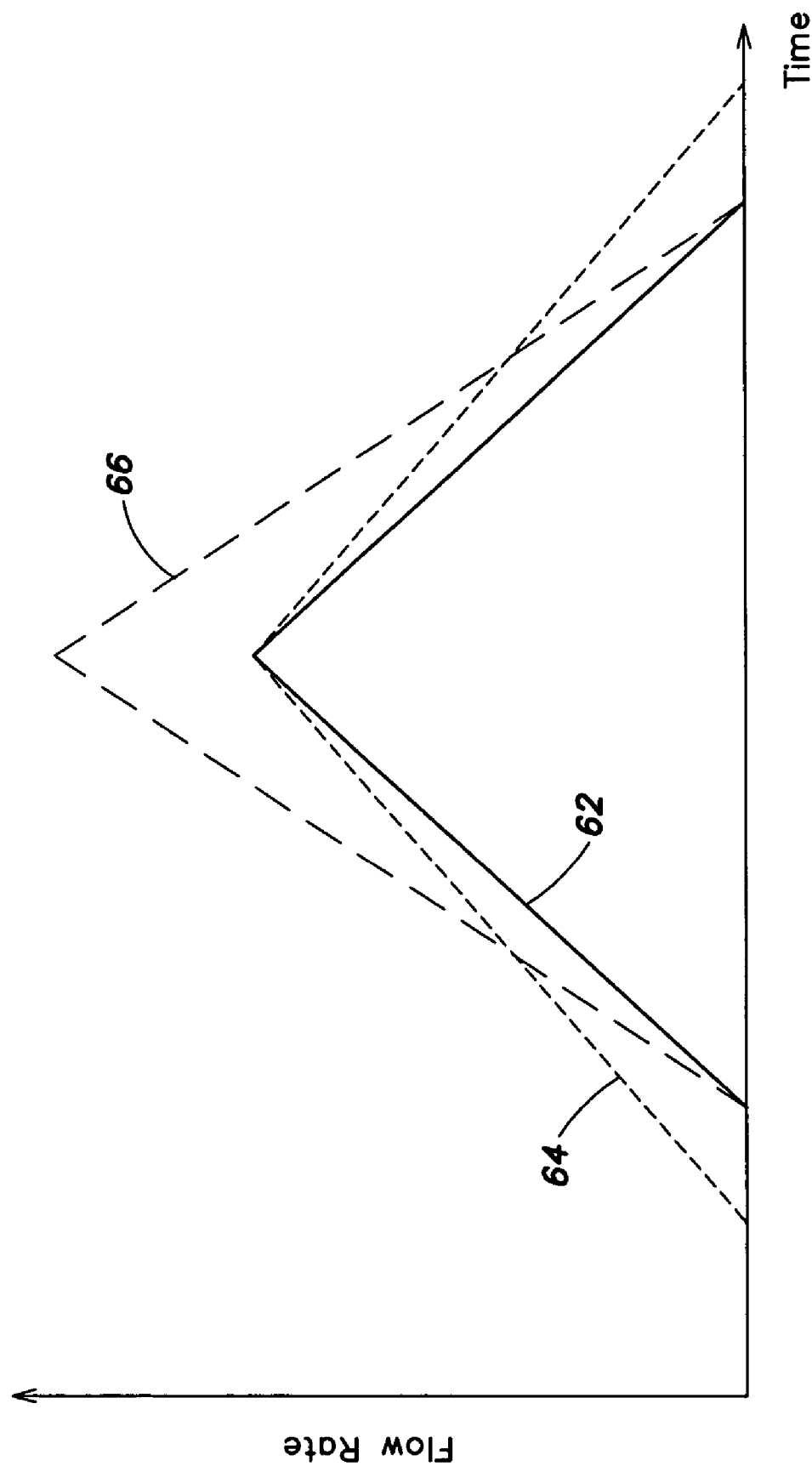
FIG. 10 is an illustrative graph depicting the relative flow rates of valves shown in FIGS. 9a–9c.

As discussed above, the shape of a port is one feature that may be used to define fluid flow rates while a valve is opened and/or closed. By way of example, FIGS. 9a–9e illustrate examples of port shapes and FIG. 10 is an illustrative graph showing the flow rates associated with the valves of FIGS. 9a–9c. Here, FIG. 9a illustrates a port with a substantially square opening having a flow rate represented by a solid line 62 in FIG. 10. Lengthening the square in the direction parallel to relative movement between the rotor and housing (e.g., along arrow "A"), as illustrated in FIG. 9b will extend the duration of time that the valve is open—all else constant, as shown by a first dashed line 64 in FIG. 10. Similarly, shortening the port as illustrated in FIG. 9c will shorten the duration of time that the valve is open, as shown by the second dashed line 66 in FIG. 10. The leading 68 and/or trailing 70 edges of the port can be widened with respect to central portions of the port to create a more abrupt opening or closing of the valve, as illustrated in FIG. 9d. Alternately, the leading and trailing edges can be made thinner, like those of the ovalized port in FIG. 9e to make for a smoother transition between the open and closed position. Those of skill in the art may appreciate that the above described port embodiments show a few techniques for defining flow rates through a valve, and that other designs may also be chosen, as aspects of the invention are not limited in this regard.

Figure 11:
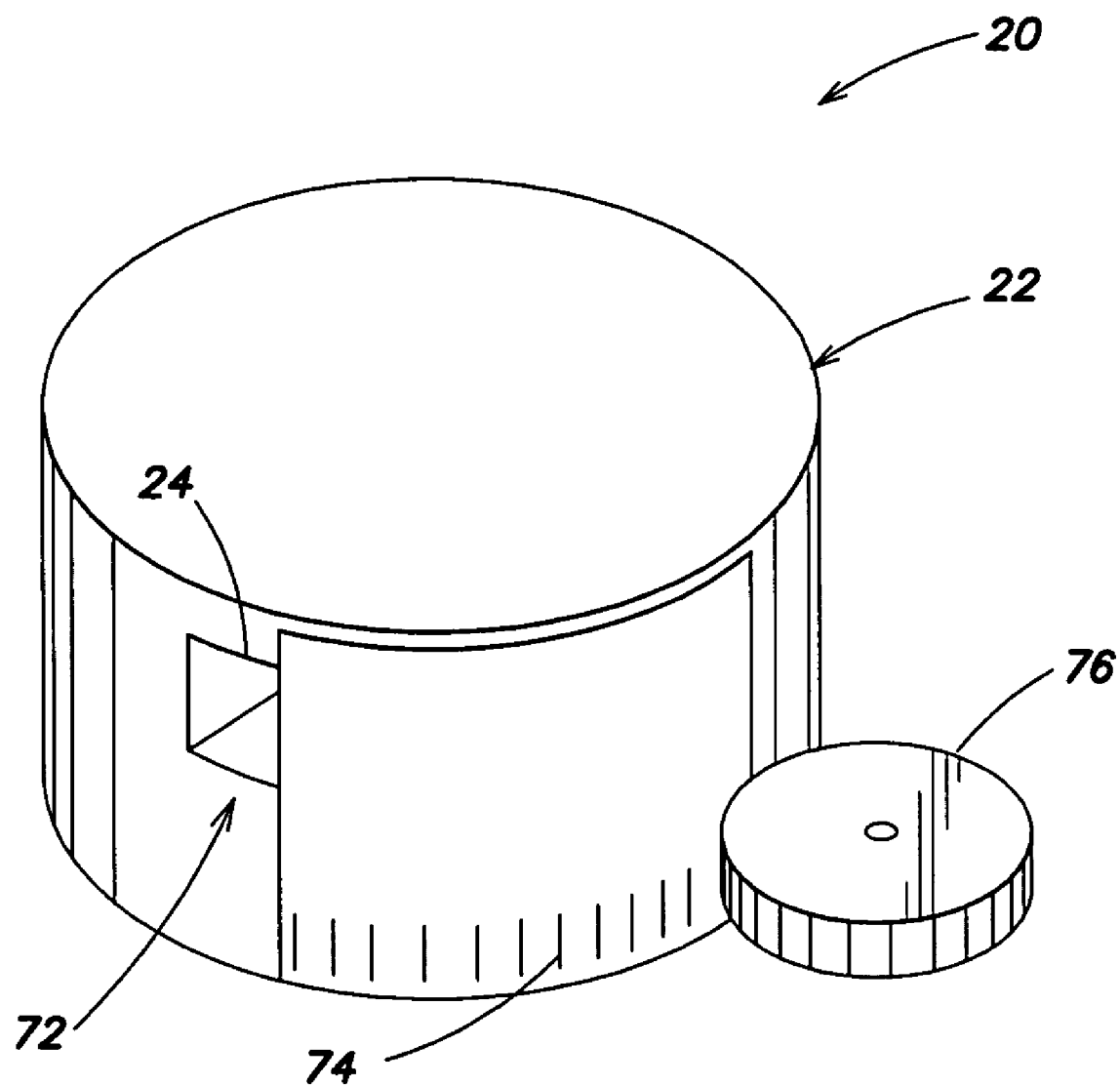
FIG. 11 is an illustrative view of an embodiment of a rotary valve having a mechanism to allow variable valve timing and/or variable valve flow rates.

In some illustrative embodiments, a rotary valve includes features that can restrict the flow of fluid through the valve, independent from the position of the flexible sealing member and the valve seat. FIG. 11 illustrates an embodiment of such a device. Here, a second closable port 72 can restrict flow through the valve at a position either downstream or upstream of the valve seat/flexible member interface. In the illustrated embodiment, the second valve has a rack 74 and can be moved from the open to closed position by the rotation of a pinion 76. Such embodiments may be particularly useful in automotive applications, where variable valve timing and/or a variable port size may be desired.

It should be noted that the second closable port 72, although shown on an upstream portion of the valve can be located on a downstream portion, as the present invention is not limited in this respect. For example, the second port 72 may be disposed at the interface between the flexible member and the housing. In one embodiment the second closeable port 74 is formed from a sheet of material, such as metal sheet stock.

In another embodiment, the port may be formed with multiple smaller, individual ports. The second closeable port 74 may be configured to selectively close one or more of these individual ports.

To aid in sealing, pressure from the system in which the valve operates can be used to urge the flexible member into engagement with the port. For example, the flexible member may be located on a high pressure side of the housing so that the flexible member is forced into engagement with the valve seat by the high pressure fluid when the valve is closed. As is to be appreciated, the force applied to the rotor may not be so great that it prevents the rotor from moving. An additional resilient member may be used to direct the rotor toward the housing such that the valve can seal when the pressure on the high pressure side is lower. However, it is to be appreciated that not all embodiments require an additional resilient member, as the invention is not limited in this respect. Still, some embodiments may rely solely on a resilient member to apply pressure between the flexible member and port to effect a seal.

Figure 16:
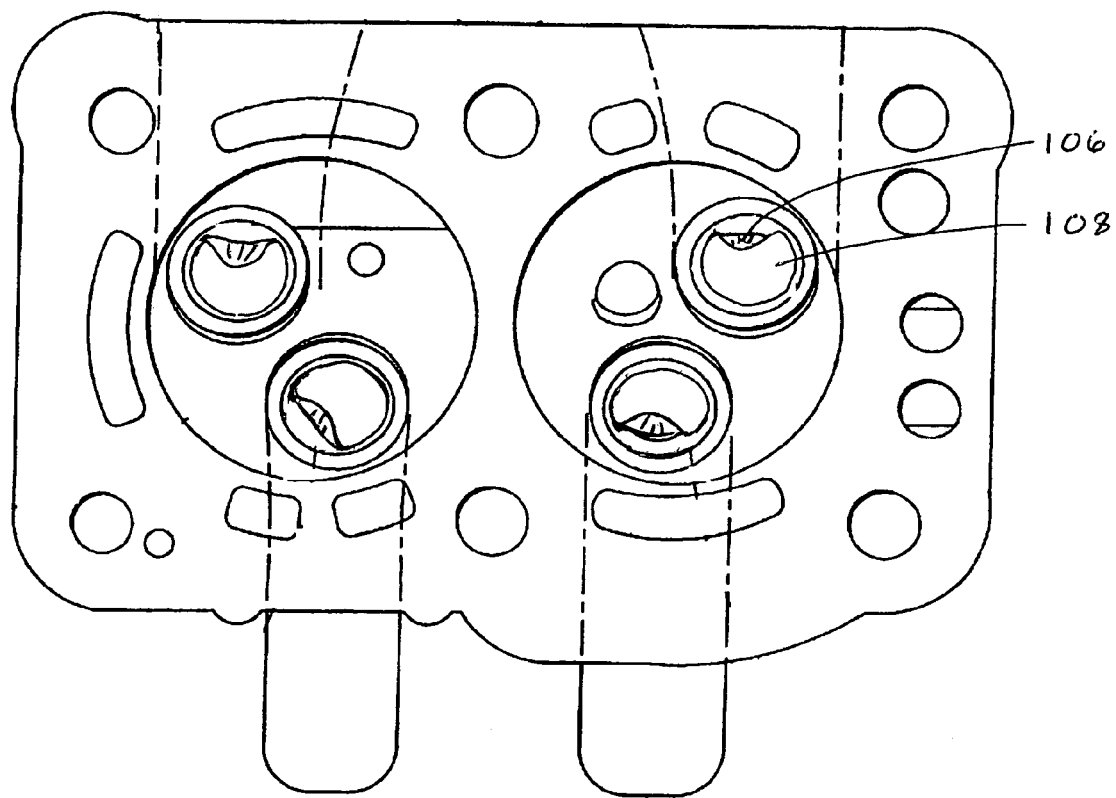
FIG. 16 is the view of the interface between the cylinder head and engine block of an embodiment of a valve incorporated into an internal combustion engine.

By way of example, a flexible member of a rotary valve can be disposed between the combustion chamber of the engine and the housing of the valve, in this case, the cylinder head of the engine, as represented in FIG. 16. When pressure builds up in the combustion chamber, such as during combustion, the pressure forces the rotor and/or flexible member toward the housing, thereby creating a force to aid in sealing the valve.

It is desirable in some embodiments to keep the flexible member within consistent areas of the interface between the rotor and housing. This can help prevent excessive wear and improve sealing characteristics of the valve. Embodiments of rotary valves can include features to help position the flexible member with respect to the rotor and/or housing. By way of example, a housing can have a lip extending about the outer and/or inner edge of the flexible member. Here, the lip can prevent the flexible member from shifting out of position. In other embodiments, friction levels between the housing and the flexible member may be increased to help prevent the flexible member from sliding with respect to the housing. In one embodiment, magnets in either the rotor and/or housing can help hold a magnetic flexible member in place. Still, other features and/or techniques may be used to control the position of the flexible member, as the present invention is not limited to the above described approaches.

Embodiments of the present invention may be constructed such that lubrication of the flexible member/rotor interface is not required. For example, the interface between the rotor and flexible member may comprise an undulated surface to reduce wear. The undulated surface may be provided on the flexible member or the rotor. Alternatively, an undulated surface may be provided on the housing, where it may be particularly advantageous in trapping particles, in addition to reducing wear.

However, some embodiments and/or applications may benefit from lubrication. In some cases, features may be included within the valve to help transport lubricants toward and away from the sliding interface. For example, a lubrication supply port may be incorporated into either the rotor, the housing or other components of the valve. In some embodiments, the surfaces of the flexible member and/or the rotor may include grooves and or pockets to help distribute lubrication about the sliding surface. Components may be impregnated with lubrication as well. Other features may also be incorporated into the valve design to help distribute lubrication, or the dispense with any requirement for lubrication—as the invention is not limited to any one of the above described features.

As indicated above, many embodiments of the rotary valve have a rotor that moves a buckle in rolling contact with a housing surface to open and close the valve. The rotor may be actuated by various mechanisms in different embodiments. In some embodiments, the rotor includes a shaft along its central axis. The shaft may be rotated by an external power source that drives the rotor/shaft assembly. The rotor can extend through a passageway in the housing to hold the rotor in proper alignment with the housing. In other embodiments, the rotor or housing may be driven directly by a driver 78 that is in rolling contact with a portion of the valve. For example, FIG. 4 shows a drive roller that rotates the housing 22 relative to a stationary rotor 26. Other embodiments can have a clutch or other mechanism that engages components of the valve to cause the valve to be opened and closed, as the present invention is not limited to any particular drive mechanism.

The rotor, in some embodiments, is also flexible to provide for improved sealing characteristics between the housing and the flexible member. In this regard; the flexible rotor can better conform the flexible sealing member to the valve seat to improve sealing, even if irregularities are present. Also, a flexible rotor can provide for improved wear characteristics of the flexible member and/or rotor. The interface between a stiff housing and rotor if not formed correctly or if deformed during use can create unintended high pressure areas. The flexible member, where it is subjected to such high pressure areas, may wear faster than at other points. This may be particularly the case if the rotor and/or housing are made of a hard material. Valves having flexible rotors, such as rotors made of an elastomer, can distribute the pressure between the flexible member and rotor/housing to avoid unintended high pressure areas and associated high wear areas.

Thus, as can be appreciated, the rotor can be formed of any suitable material and in any suitable geometry, as the present invention is not limited in this respect. It can be formed of a plastic, ceramic, metal, or electrometric material. In addition, the flexible member may be formed as a flexure, having compliant characteristics. For example, in one embodiment the rotor may employ a plurality of springs to bias it in contact with the flexible member. Alternatively, the rotor may be formed in a corrugated manner, which elastically deforms as the geometry requires.

Figure 12:
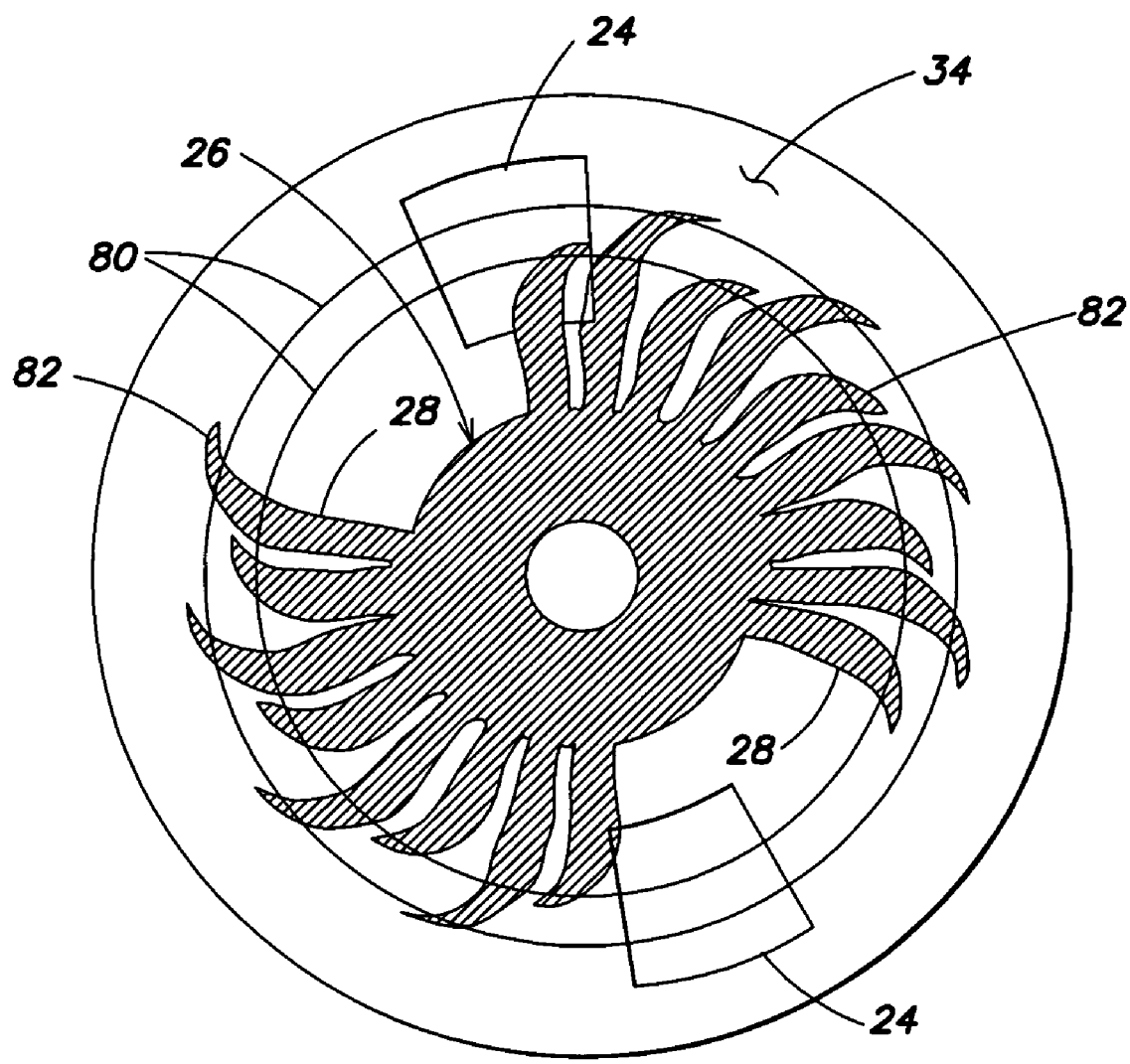
FIG. 12 illustrates another embodiment of a rotary value, with the rotor having a plurality of flexible fingers.

The high pressure areas in some rotary valve designs may comprise a single line of contact 80 running in a direction that follows the relative movement between the rotor and housing. Such line contact can occur in many embodiments including cone-shaped valves, particularly when the angle of the rotor surface does not match the angle of the housing surface, thereby causing line-contact at the interface therebetween. Line contact is desirable in some embodiments to improve sealing, as it can create an area of higher pressure that can prevent fluids from passing from one side of the line of contact to the other. In this regard, some valve embodiments may provide line contact at positions outboard and/or inboard of a valve seat in the housing. Placing the lines of contact in this manner can seal the flexible member against the inboard or outboard edge of the valve seat to help improve sealing. However, as described below it may be desirable to place lines of contact elsewhere between the rotor and housing. For example, arranging disk or cone shape valves such that a circular line of contact lies closer to the center of the port, such as at a radius shared with the middle of a port, can better hold the flexible member against the housing surface. FIG. 12 shows an embodiment of a valve with lines of contact placed in this manner. Specifically, placing a line of contact in such a position can prevent interior portions of the flexible member from lifting away from the housing surface while also holding exterior portions to the housing.

The rotor of FIG. 12 is made of a plurality of flexible fingers 82 which, in this embodiment, are of varying radial lengths that together cooperate to provide wider lines of contact 80 between the flexible member and the housing. As may be appreciated, lines of high pressure contact, although beneficial for some reasons, may be associated with higher wear in some embodiments. The flexible fingers shown in FIG. 12 can distribute the pressure about a wider line of contact to achieve the benefits of line contact, while avoiding increased wear. It is to be appreciated that these benefits can be achieved by embodiments of the invention having rotors designed in other ways, as these aspects of the present invention are not limited to rotors with flexible fingers.

As also shown in FIG. 12, some rotary valves can expose the flexible member to the working fluid on one side of the valve. Although the flexible member is not shown in FIG. 12, one can appreciate that pressure of the working fluid can act directly on the flexible sealing member as the flexible member will be exposed between the fingers of the rotor. In this manner, the working fluid can help seal the valve as previously discussed. Such embodiments also allow a rotor to be made of substantially lower mass and/or to have a lower moment of inertia. In this manner, the rotor can be actuated with less energy, further reducing the energy required to operate the rotary valve.

FIG. 12 is a plan view of a flexible member 30 adapted to form multiple buckles 40. As can be appreciated, valves are not limited to opening only once during a complete rotation of a rotor 26. The embodiment of FIG. 12 allows the flexible member to be formed so as to include two separate buckles that each open the valve twice during a single revolution. Although the buckles of FIG. 12 are each aligned with corresponding ports in the housing twice during each revolution, other embodiments may have a single port that can be aligned with multiple discontinuities/buckles during each revolution of the rotor. Still, other embodiments can provide different sized buckles and/or ports that can be selectively operated depending on the desired flow rate through the valve. For example, a valve may have a single buckle that can reciprocate between ports of two different sizes depending on the desired flow rate through the valve. Although examples with a single buckle and port, and two buckles and/or ports are discussed, it is to be appreciated that valves can have more than two buckles and/or ports, as the invention is not limited in this regard. It is also to be appreciated that although the embodiment with multiple buckles and ports shown in FIG. 12 has a plurality of flexible fingers acting as a rotor, that any of the other embodiments described herein may also have multiple buckles and/or ports.

Figure 13:
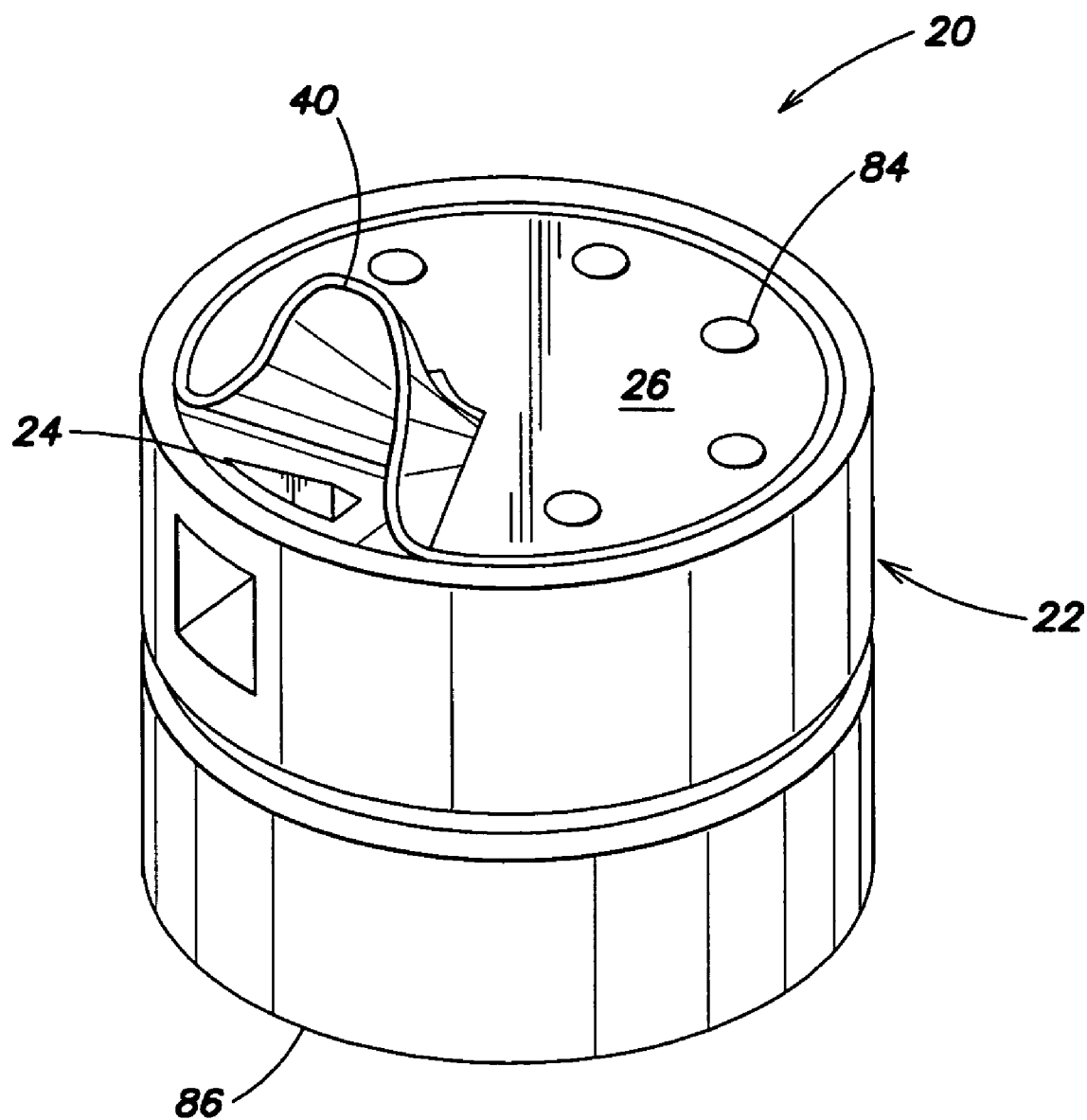
FIG. 13 is an illustrative view of a rotor with an array of magnets on one side of the housing and mechanism to drive the rotor disposed on the opposite side of the housing.

Some illustrative embodiments include non-contact actuators to move the rotor and/or flexible member, instead of contact mechanisms previously described. A magnetic actuator is one example of such an actuator. As shown in the illustrative example of FIG. 13, an array of magnets 84 are disposed within the rotor 26 on one side of the housing and an actuator 86 is disposed on the opposite side of the housing that is attracted to the array of magnets. The rotor can follow the rotation of the actuator to operate the valve between open and closed positions. Such magnetic drives may prove particularly beneficial in applications where it is desirable to eliminate drive mechanisms on one side of the valve. In other embodiments, the array of magnets may be part of the actuator, instead of the rotor. Still, in other embodiments, the array of magnets may comprise a complete ring of electromagnets that are selectively activated to mimic the rotation of a partial array of magnets. Although the magnets can be arranged in the configuration shown, the present invention is not limited in this respect, as other suitable arrangements may be employed.

In some embodiments, the flexible sealing member can be driven directly through magnetic forces from a rotor on the opposite side of the housing. As described above, the rotor can include an array of rotatable magnets, or a stationary array of electromagnets that can be actuated in a manner that creates a rotating magnetic field. Some embodiments can have a flexible member comprised either entirely or partially of a material attracted to the magnets of the rotor. As the magnetic field of the rotor moves, it can direct a discontinuity about the surface of the housing to open and close the valve.

Having magnets within the rotor and/or housing of a valve may also serve other beneficial purposes. As previously discussed, the magnets can hold a flexible member within appropriate positions between the rotor and the housing, similar to a lip. Additionally, magnets can provide an attractive force between the rotor and housing to either assist or replace other resilient mechanisms that might be used to accomplish this.

Some embodiments of rotary valves employing magnetic drives will now be described.

Figure 14A:
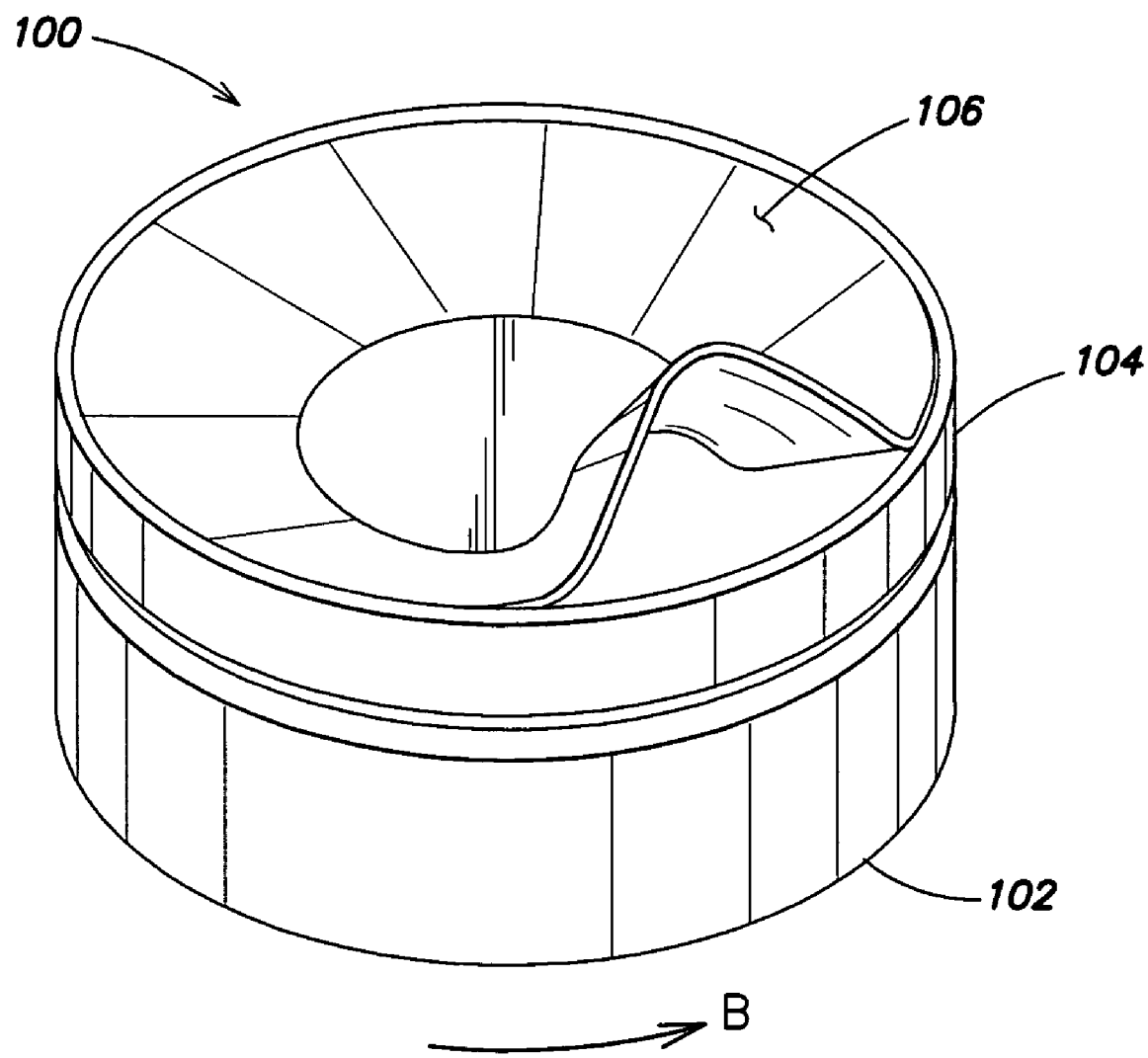
FIGS. 14a and 14b are illustrative examples of alternative rotary valves employing magnet actuators.

In one embodiment, as shown in FIG. 14a, the rotary valve 100 is arranged with a magnetic rotor 102 located on one side of the valve housing 104 driving a flexible sealing 106 member on the opposite side of the housing 104. The rotor may employ one or more permanent magnets or may be formed as a magnet itself. Rotation of the rotor (e.g., along arrow "B") results in rotating a magnetic force about the housing such that the flexible sealing member follows the magnetic force in a rolling motion as described above about the housing to intermittently seal the port. In another embodiment, not shown, electromagnets may be employed, with the rotor being replaced with an electronic control system to selectively activate the magnets. This selective actuation causes the buckle of the sealing member to roll into and out of contact with the housing to intermittently seal the port. Alternatively, in another embodiment, a combination of the permanent magnets and electromagnets may be employed. In these embodiments, it should be appreciated that the flexible member should have sufficient magnetism to be able to seal under the circumstances. Coatings may be employed to render the flexible sealing member more magnetic. In some applications, such as for example, lower temperature applications, a plastic flexible member may be employed.

Figure 14B:
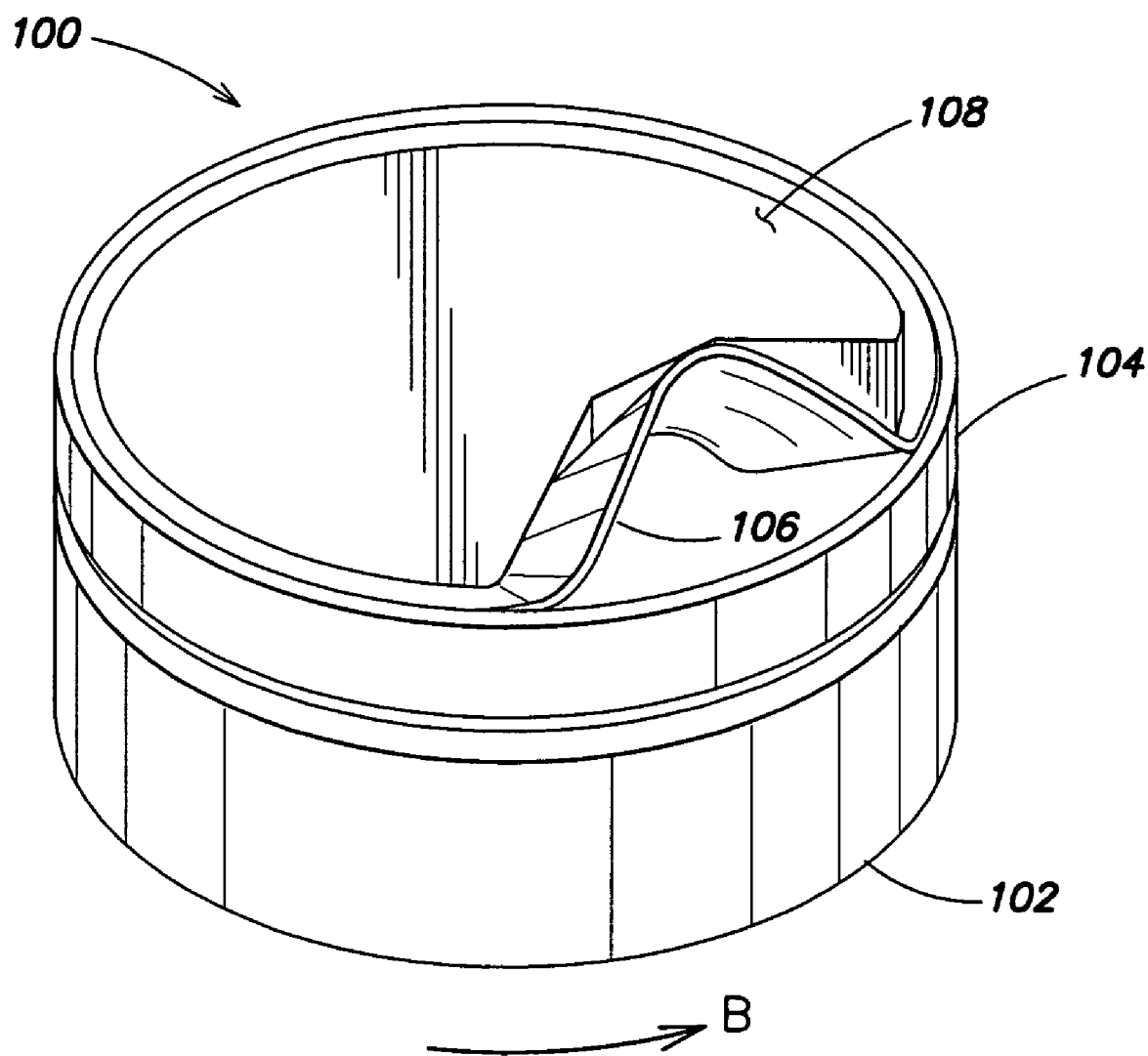

In another embodiment, as shown in FIG. 14b, where, for example, the desired magnetic characteristics of the flexible member cannot be attained, a rotor 108 having the suitable magnetic characteristics may be placed adjacent the flexible member 106. In this embodiment, the rotor and/or electromagnetic actuator may be employed from below the housing to actuate the rotor above the housing, which in turn acts on the flexible member to intermittently seal the port.

In still another embodiment, which is similar to the embodiment described with reference to FIG. 14b, the upper rotor also includes permanent and/or electromagnets.

In yet another embodiment, which is similar to the embodiment described with reference to FIG. 14b, the lower rotor is free of magnets but the upper rotor includes permanent and/or electromagnets.

It is also possible for an actuator to be built directly into the flexible sealing member. For example, some embodiments can have a flexible sealing member that includes piezoelectric actuators that, when activated, cause the flexible member to move in rolling contact with the surface of the housing.

In another embodiment described with reference to FIGS. 15a–15d, the valve includes a housing with a port, an actuator and a flexible sealing member. In the valves described above, the flexible member cooperates to seal the port and a portion of the flexible member (e.g., the buckle) is employed to open the port. However, as explained above, the flexible sealing member may translate along the housing. This translation can be employed to open the valve instead of the buckle portion being used to open the valve. The buckle portion of the flexible sealing member, in this embodiment, is employed merely to cause the flexible member to translate along the housing.

As in the examples previously described, embodiments of this valve includes two interfaces: a sealing interface disposed in facing relation with the housing port and a low-friction interface disposed in facing relation with the actuator. As with the embodiments described above, the sealing interface is in rolling contact over the port, whereas the low-friction interface is in sliding contact with the actuator (or rolling contact when roller bearings are employed between the actuator and flexible sealing member). Alternatively, as described above, magnets may be employed to actuate or move the flexible member. Thus, in this regard, there may be no contact, sliding or otherwise, between the flexible sealing member and the actuator.

Actuation of the valve may be achieved with the use of any suitable arrangement, such as any of those described herein, and, although shown as a linear valve in FIGS. 15a–15d, the valve can be arranged in any suitable geometry, such as those described herein, as the present invention is not limited in this respect. Similarly, the actuator may operate in any suitable manner, such as in a continuous loop or in reciprocating motion, or any suitable combination of these or other motions as the present invention is not limited in this respect.

In the embodiment shown schematically in FIGS. 15a–15d, the flexible sealing member includes at least one hole formed therethrough, as shown. In some embodiments, a plurality of holes may be employed. As the flexible sealing member moves along the housing, that is, as it rolls along the housing in rolling contact, the hole(s) in the flexible member periodically lines up with the port in the housing. When aligned, the valve is opened. When misaligned, the valve is closed.

Figure 15A:
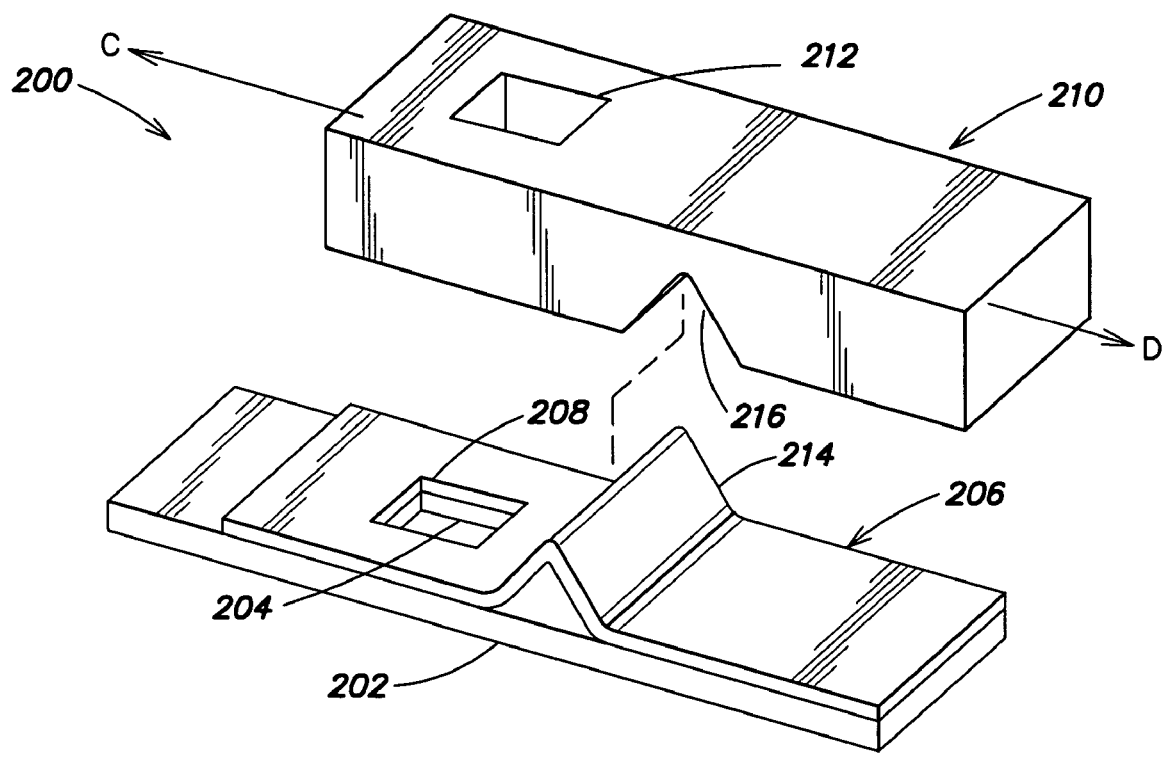
FIGS. 15a–15d are illustrative schematic representations of an alternative valve.

More specifically, as shown in the schematic representation of FIG. 15a, the valve 200 includes a housing 202 having a port 204, a flexible sealing member 206 having a hole 208, and an actuator 210 (shown displaced from the housing and flexible sealing member) and also having a port 212. The flexible sealing member 206 further includes a buckle 214 that sits within a discontinuity 216 formed in the actuator 210. When the actuator is placed over the flexible sealing member and the housing, the housing port 204, hole 208 and actuator port 212 generally align so that flow through the valve can be attained.

Figure 15B:
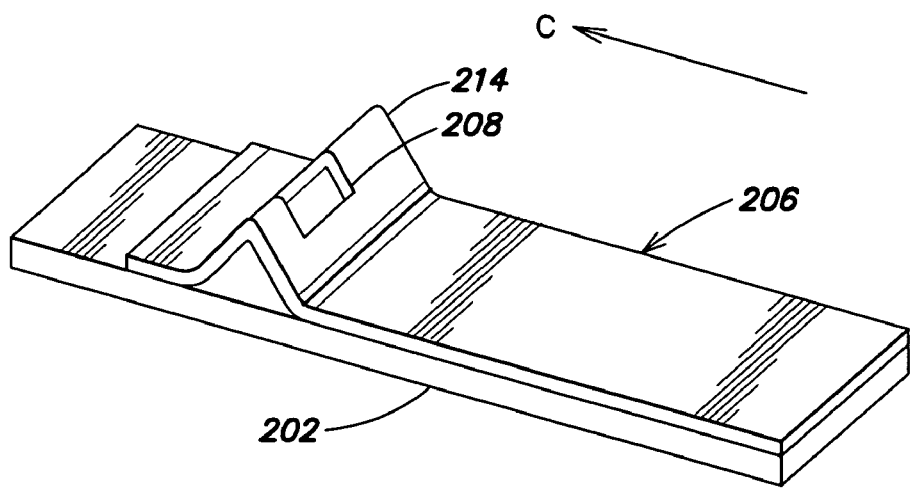
Figure 15C:
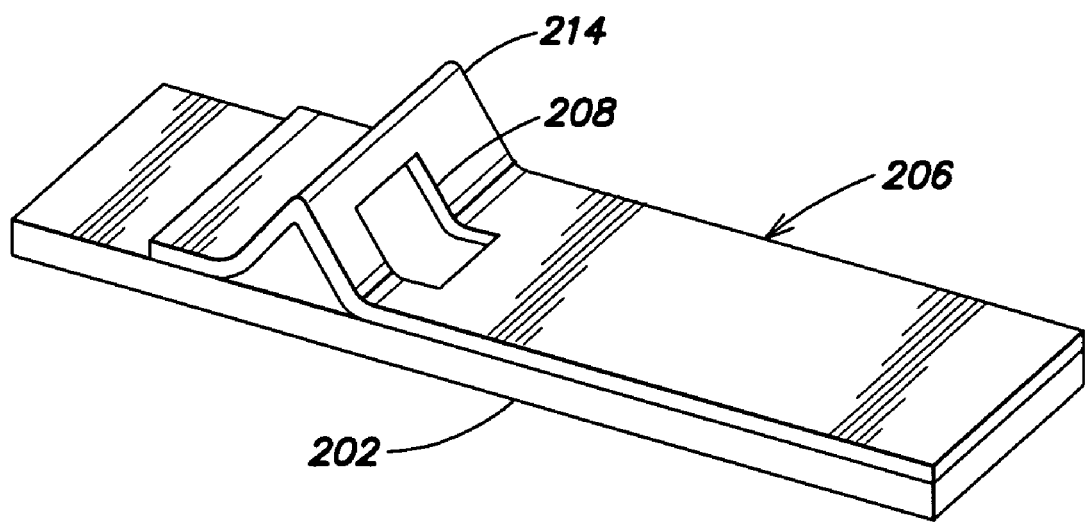
Figure 15D:
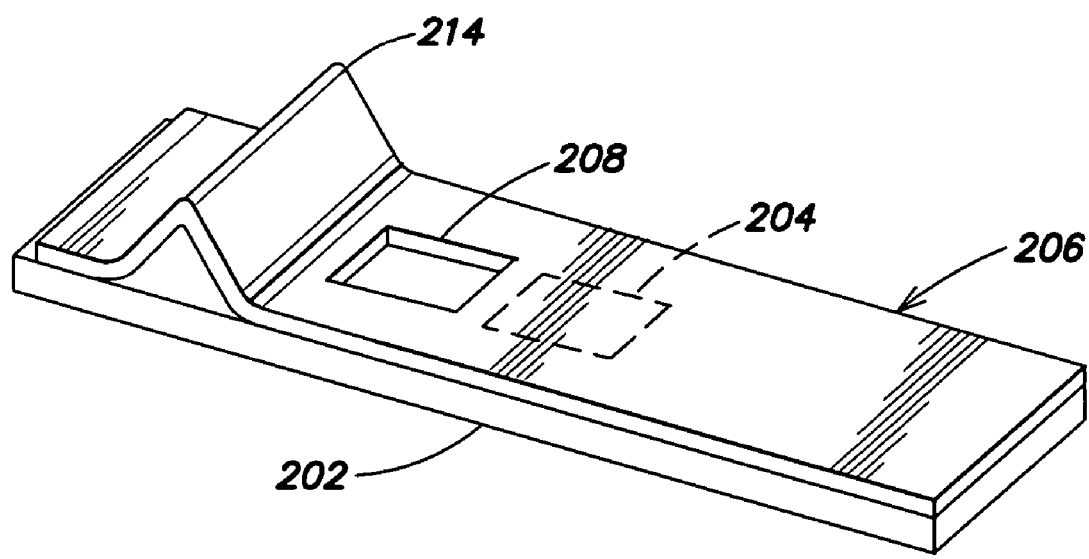

To close the valve, the actuator is moved along arrow "C". This in turn causes the discontinuity 216 to push on the buckle 214 to move it along the flexible sealing member, like a wave, along the same direction, as shown in FIG. 15b (the actuator has been removed for clarity). Continuing to move the actuator 210 along arrow "C" continues to move the buckle 214, as shown in FIGS. 15c and 15d. This movement causes the hole 208 in the flexible sealing member to lift off and move along the housing such that the hole 208 no longer aligns with the hole 204 in the housing (shown in phantom in FIG. 15d) and/or in the actuator, resulting in a closed valve. To open the valve, the actuator (in this example) is moved in the opposite direction along arrow "D".

Advantageously, the valve described with reference to FIGS. 15a–15d may offer relatively high volumetric efficiencies. This may be because there is no buckle to interfere with the flow, rather the port in the flexible member overlies the port in the housing in a non-interfering manner, as shown. Further, the valve may operate in a more binary mode than in the previously described versions. That is, the arrangement of the hole in the flexible sealing member operates to either fully open or fully close the valve. In addition, the valve may require less precision in opening/closing than in the previously described valves.

In another embodiment, the flexible sealing member is formed as a continuous tube or band with one or more holes in it and may be employed in a cylindrical valve. In this manner, continuous rotary motion may be employed. In this embodiment, however, several revolutions of the valve may be required to open and close a particular port. In one example, the valve is entirely open in one revolution, and then entirely closed in the second revolution. Thus, the cycle is two revolutions. However, the present invention is not limited in this respect and the valve can be configured such that it is open for five revolutions and closed for three, to disclose but one example.

In embodiments where it is desirable to open the valve for a longer duration, the hole in the flexible sealing member is made larger than that of the port. Thus, as the flexible sealing member moves along, the hole would still align with the port. To seal over additional revolutions of the valve, the space between the multiple holes on the flexible member would be longer.

It should be appreciated that the present invention is not limited to any particular valve configuration and the translation motion to open and close the valve described with reference to FIGS. 15a–15d can be employed in any valve, such as a disk valve, a conical valve, a cylindrical valve, a spherical valve or a linear valve.

Embodiments of the valve discussed herein can be used in a variety of applications. In particular, one application that may benefit from the utilizing the rotary valve disclosed herein is an internal combustion engine. Rotary valves may replace poppet style valves typically used as intake and exhaust ports in the engine. In one embodiment, the engine includes a cylinder block having at least one cylinder, and a cylinder head coupled to the cylinder block and covering an open end of the cylinder. The cylinder head includes an intake and/or exhaust port communicating with the cylinder. The rotary valve may be placed in a cylinder head to intermittently seal the port. Although in one embodiment, the rotary valve seals one port, the present invention is not limited in this respect, as the valve can be employed to seal multiple ports, e.g., both an intake port and an exhaust port. The valve may also be exposed to the working fluid within the combustion chamber. Such an embodiment can eliminate the concern of valve-to-piston contact that often must be considered when poppet valves are used. In addition to reduced friction, the rotary valve may be operated with less energy expenditure because its movement can be made continuous in a single direction, thus eliminating the energy required to overcome inertia as with reciprocating poppet valves. In some embodiments, the rotor and/or flexible member rotating within the combustion chamber can also be used to improve mixing within the cylinder chamber thus improving performance of the engine.

Components of the valve, such as one or more of the components described herein, may be formed using suitable manufacturing techniques to achieve desired functionality. For example, components may be forged, cast or cut from stock of suitable material (e.g., having a suitable Young's modulus); machined or formed to appropriate size, tolerance, smoothness, flatness and other surface finishes; completed to appropriate hardness, flexibility, stiffness, etc. and provided with suitable coatings and fatigue properties/characteristics. These and/or other manufacturing techniques may be employed, as the present invention is not limited in this respect.

Embodiments of the valve may be optimized using any design methodology. In one example, the principles of axiomatic design may be employed in combination with the beneficial features disclosed herein, to arrive at the most suitable valve for a particular application. In this regard, a designer is free to choose among the features discussed herein as required to meet the functional requirements of any particular application. In particular, the features discussed herein may be employed in a manner that reduces or eliminates coupling between the functional requirements and design parameters of a system.

In one embodiment, such as, for example, the embodiment described with reference to FIGS. 1a and 1b where the high pressure is applied on the side of the valve having the flexible member, applying axiomatic design principles, below is an example of a decomposition of the valve.

[FR0] control flow through port
[DP0] Valve system
[FR1] seal port
[DP1] sealing system
[FR1.1] provide and maintain micro-level sealing around port
  [DP1.1] surface finish
  [FR1.1.1] manufacture smooth surface finish
  [DP1.1.1] manufacturing processes
    [FR1.1.1.1] provide smooth surface finish on port surface
    [DP1.1.1.1] die-cast operation (optional grinding operation)
    [FR1.1.1.2] provide smooth surface finish on flexible member
    [DP1.1.1.2] rolling operation
  [FR1.1.2] maintain smooth surface finish
  [DP1.1.2] material properties
    [FR1.1.2.1] maintain smooth surface finish on port surface
    [DP1.1.2.1] port surface hardness (or coating)
    [FR1.1.2.2] maintain smooth surface finish on flexible member
    [DP1.1.2.2] flexible membrane surface hardness (or coating)
[FR1.2] provide and maintain macro-level sealing around port
  [DP1.2] geometric alignment
  [FR1.2.1] maintain 'flatness' of flexible member
  [DP1.2.1] flexible member thickness
  [FR1.2.2] prevent crack formation in flexible member
  [DP1.2.2] crack prevention
    [FR1.2.2.1] avoid interference
    [DP1.2.2.1] flexible member diameter, etc.
    [FR1.2.2.2] avoid cyclic fatigue
    [DP1.2.2.2] flexible member guide (i.e.—fillets)
  [FR1.2.3] provide radial contact between housing and flexible member
  [DP1.2.3] flexible member bending mechanism
    [FR1.2.3.1] provide sufficient force
    [DP1.2.3.1] rotor flexure stiffness
    [FR1.2.3.2] provide sufficient force distribution
    [DP1.2.3.2] rotor flexure radial distribution
    [FR1.2.3.3] allow for variation in angle
    [DP1.2.3.3] compliance of rotor flexure
  [FR1.2.4] provide circumferential contact between housing and port
  [DP1.2.4] flexure force distribution system resolution
  [FR1.2.5] maintain contact between housing and flexible member
  [DP1.2.5] Pressure differential (self-help)
  [FR1.2.6] provide/maintain near concentricity of flexible member
  [DP1.2.6] circumferential magnets
[FR2] open port
[DP2] lift flexible member
  [FR2.1] provide buckling
  [DP2.1] cone angle
  [FR2.2] manage size of buckled portion
  [DP2.2] cut (discontinuity) in rotor
  [FR2.3] manage height of buckled portion
  [DP2.3] flexible member young's modulus
[FR3] control timing
[DP3] actuation system
  [FR3.1] control frequency
  [DP3.1] actuation speed
  [FR3.2] control % time open
  [DP3.2] port size
[FR4] minimize friction
[DP4] friction reduction system
  [FR4.1] minimize coefficient of friction between flexible member and rotor
  [DP4.1] surface properties of rotor
  [FR4.2] minimize interaction force between flexible member and housing
  [DP4.2] raised valve seat The below decomposition relates to a rotary cone valve as well, except in this embodiment, the pressure is applied on a side opposite the flexible member (that is the high pressure is applied on the housing side of the valve). In addition, in this embodiment, the actuator includes a pressure plate or is formed as a compliant flexure. Most of the above decomposition is the same with the following replacements.

[FR1.2] provide and maintain macro-level sealing around port
[DP1.2] geometric alignment
[FR1.2.1] maintain 'flattness' of flexible member
[DP1.2.1] flexible member thickness
[FR1.2.2] prevent crack formation in flexible member
[DP1.2.2] crack prevention
    [FR1.2.2.1] avoid interference
    [DP1.2.2.1] flexible membrane diameter, etc.
    [FR1.2.2.2] avoid cyclic fatigue
    [DP1.2.2.2] flexible member guide (i.e.—fillets)
[FR1.2.3] provide radial contact between housing and flexible member
[DP1.2.3] pressure plate
    [FR1.2.3.1] provide sufficient resistive force in radial direction
    [DP1.2.3.1] pressure plate thickness and material
    [FR1.2.3.2] provide sufficient circumferential compliance
    [DP1.2.3.2] radial cutouts
    [FR1.2.3.3] allow for angular variation of cone
    [DP1.2.3.3] pivot/hinge between pressure plate and rotor
[FR1.2.4] provide circumferential contact between housing and port
[DP1.2.4] pressure plate distribution resolution
[FR1.2.5] maintain vertical contact between housing and flexible member
[DP1.2.5] floating valve seat With regard to the embodiments described with reference to FIGS. 15*a*–15*d*, the following decomposition is replaced in the first decomposition described above.

[FR2] open port
[DP2] flexible member holes
[FR2.1] provide rolling translation of flexible member relative to housing
[DP2.1] flexible member buckle
[FR2.2] allow for flow through flexible member
[DP2.2] circumferential holes in flexible member
[FR2.3] ensure circumferential alignment of holes
[DP2.3] flexible member guiding mechanism
[FR3.2] Control % time open
[DP3.2] size of holes in flexible member.

It should be appreciated that these decompositions are exemplary only and other decompositions may be contemplated for these or other valve embodiments, as the present invention is not limited in this respect. In addition, it should be appreciated that the principles of axiomatic design need not be employed to produce a suitable valve, as other design methodologies may be employed.

It should be appreciated that the present invention is not limited to any embodiment described herein and that other suitable embodiments employing one or more features described herein (or other suitable features) may be employed in or with the valve.

Having thus described certain embodiments of a valve, various alterations, modifications and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalent thereof.

What is claimed is:

1. An engine comprising:
a cylinder block having at least one cylinder;
a cylinder head coupled to the cylinder block and covering an open end of the at least one cylinder, the cylinder head having a port communicating with the cylinder; and
a rotary valve cooperating with the port to intermittently seal the port, with said rotary valve comprising a rotor rotatable relative to the port, a member disposed between the rotor and the port, with the rotor acting on the member to intermittently seal the port as the rotor rotates
wherein the member is substantially stationary relative to the port and is substantially slidable relative to the rotor.

2. A valve comprising:
a housing having a port;
an actuator movable relative to the housing; and
a flexible member disposed between the housing and the actuator, the actuator acting on the flexible member so that the flexible member intermittently seals the port as the actuator moves;
wherein the actuator has a housing-facing surface that is formed with a discontinuity, the discontinuity cooperating with the flexible member to allow the flexible member to move away from the port as the actuator moves and the discontinuity passes over the port.

3. The valve of claim 2, wherein the valve is configured as a rotary valve and the actuator is a rotor, wherein the housing has a rotor-facing surface through which the port extends, the rotor-facing surface defining a cone shape.

4. The valve of claim 3, wherein the rotor has a housing-facing surface, the housing-facing surface defining a cone shape.

5. The valve of claim 4, wherein the flexible member is adapted to conform to the cone-shaped surface of at least one of the rotor-facing surface and the housing-facing surface.

6. The valve of claim 2, wherein the valve is configured as a rotary valve and the flexible member is disc-shaped.

7. The valve of claim 2, wherein the flexible member is adapted to buckle into the discontinuity, thereby forming a wave that moves along the flexible member as the actuator moves.

8. The valve of claim 2, wherein the flexible member and the port define a sealing interface, and wherein flexible member and actuator define a low-friction interface.

9. The valve of claim 8, wherein at least one of the actuator and flexible member is coated with a low-friction material.

10. The valve of claim 8, wherein at least one of the actuator and flexible member is formed of a low-friction material.

11. The valve of claim 2, wherein the flexible member comprises shim stock.

12. The valve of claim 2, wherein the actuator has a housing-facing surface, the housing-facing surface comprising an undulated surface.

13. The valve of claim 2, wherein a periphery of the port comprises a valve seat.

14. The valve of claim 13, wherein the housing has a actuator-facing surface through which the port extends and wherein the valve seat is raised relative to the actuator-facing surface.

15. The valve of claim 13, wherein the valve seat is a component that is separate from the housing.

16. The valve of claim 15, wherein the valve seat and the housing comprise different materials.

17. The valve of claim 15, wherein the valve seat floats relative to the housing.

18. The valve of claim 2, wherein the port has an adjustable opening size.

19. The valve of claim 2, wherein the flexible member is substantially stationary relative to the housing and is substantially sliclable relative to the actuator.

20. The valve of claim 2, wherein the valve is configured as a rotary valve and the actuator is a rotor, wherein the rotor comprises a body and a pressure plate coupled to the body, with the pressure plate pressing on the flexible member as the rotor rotates.

21. The valve of claim 20, wherein the pressure plate is pivotally connected to the rotor.

22. The valve of claim 20, wherein the pressure plate comprises an undulated surface facing the flexible member.

23. The valve of claim 22, wherein the pressure plate comprises a plurality of cut-outs to define the undulated surface.

24. The valve of claim 20, wherein the pressure plate is coated with a low friction material on a surface facing the flexible member.

25. The valve of claim 1, wherein the flexible member is formed of a material comprising plastic or metal.

26. The valve of claim 2, wherein the actuator is built directly into the flexible member and comprises piezoelectric actuators.

27. The valve of claim 2, further comprising a feature for providing lubrication, the feature selected from a group consisting of: a lubrication supply port located in the housing, a lubrication supply port located in the actuator, grooves located on the flexible member, grooves located on the housing, and grooves located on the actuator.

28. The valve of claim 2, wherein the housing includes a lip configured to maintain the flexible member located between the actuator and the housing.

29. The valve of claim 2, wherein the housing includes a plurality of ports and further wherein the flexible member intermittently seals each of the plurality of ports.

30. A rotary valve comprising:
a housing having a cone-shaped surface;
a port extending through the cone-shaped surface;
a rotor rotatable relative to the housing and shaped to cooperate with the cone-shaped surface of the housing; and
a sealing/sliding interface disposed between the housing and the rotor and adapted to conform to the cone-shaped surface of the housing, with the sealing/sliding interface intermittently sealing the port as the rotor slidingly rotates over the interface.

31. An engine comprising:
a cylinder block having at least one cylinder;
a cylinder head coupled to the cylinder block and covering an open end of the at least one cylinder, the cylinder head having a port communicating with the cylinder, wherein a periphery of the port comprises a valve seat; and
a rotary valve cooperating with the port to intermittently seal the port, with said rotary valve comprising a rotor rotatable relative to the port, a member disposed between the rotor and the port, with the rotor acting on the member to intermittently seal the port as the rotor rotates.

32. The engine of claim 31, wherein the engine is an internal combustion engine.

33. The engine of claim 31, wherein the rotary valve comprises a housing coupled to the cylinder head.

34. The engine of claim 33, wherein the housing has a valve port communicating with the port of the cylinder head.

35. The engine of claim 34, wherein the valve port comprises a valve seat against which the member seals.

36. The engine of claim 31, wherein the valve defines a boundary between a side of the engine having a relatively high pressure and a side of the engine having a relatively low pressure, wherein the rotary valve is arranged relative to the cylinder block and the cylinder head so that the relatively high pressure aids in sealing the member against the port.

37. The engine of claim 31, wherein the member is adapted to buckle, thereby forming a wave that moves along the member as the rotor rotates.

38. The engine of claim 31, wherein the member and the port defines a sealing interface and wherein member and rotor defines a low-friction interface.

39. The engine of claim 31, wherein at least one of the rotor and the member is coated with a low-friction material.

40. The engine of claim 31, wherein at least one of the rotor and the member is formed of a low-friction material.

41. The engine of claim 31, wherein the member comprises shim stock.

42. The engine of claim 31, wherein the rotor has a member-engaging surface, the member-engaging surface comprising an undulated surface.

43. The engine of claim 31, wherein the valve seat is adapted to float relative to the port.

44. The engine of claim 31, wherein the port has an adjustable opening size.

45. The engine of claim 31, wherein the rotary valve is constructed and arranged to provide variable valve timing.

46. The engine of claim 31, wherein the member is substantially stationary relative to the port and is substantially slidable relative to the rotor.

47. The engine of claim 31, wherein the rotor comprises a body and a pressure plate coupled to the body, with the pressure plate pressing on the member as the rotor rotates.

48. The engine of claim 47, wherein the pressure plate is pivotally connected to the rotor.

49. The engine of claim 47, wherein the pressure plate comprises an undulated surface facing the member.

50. The engine of claim 49, wherein the pressure plate comprises a plurality of cut-outs to define the undulated surface.

51. The valve of claim 47, wherein the pressure plate is coated with a low friction material on a surface facing the member.

52. A valve comprising:
a housing having a housing surface and a port extending to the housing surface;
a valve seat on the housing surface disposed about the port;
a flexible membrane constructed and arranged to maintain rolling contact with the housing surface, such that the valve is closed when a portion of the flexible membrane is rolled into contact with the valve seat and such that the valve is opened when the portion of the flexible member is rolled from the valve seat; and
an actuator comprising a rotor in sliding contact with the flexible membrane, the actuator adapted to move the flexible member in rolling contact with the housing surface.

53. The valve of claim 52, wherein the valve is configured as a rotary valve and wherein the housing surface is cone-shaped.

54. The valve of claim 52, wherein the valve is configured as a rotary valve and wherein the housing surface is cylinder-shaped.

55. The valve of claim 52, wherein the valve is configured as a rotary valve and wherein the housing surface is disk-shaped.

56. The valve of claim 52, wherein the valve is configured as a rotary valve and wherein the housing is sphere-shaped.

57. The valve of claim 52, wherein the valve seat is raised relative to the housing surface.

58. The valve of claim 57, wherein the valve seat is adapted to float relative to the housing surface.

59. The valve of claim 52, wherein the rotor is adapted to conform to the housing surface.

60. The valve of claim 59, wherein the rotor includes a pressure plate.

61. The valve of claim 59, wherein the rotor comprises multiple, flexible fingers in sliding contact with the flexible member.

62. The valve of claim 61, wherein a first portion of the flexible fingers contact the flexible member along a first line of contact, and further wherein a second portion of the flexible fingers contact the flexible member along a second line of contact.

63. The valve of claim 61, wherein the flexible fingers contact the flexible member at multiple lines of contact.

64. The valve of claim 52, wherein the actuator includes at least one magnet adapted to move the flexible member in rolling contact with the housing surface.

65. The valve of claim 64, wherein the magnets comprise an array of magnets adapted to rotate a rotor in sliding contact with the flexible member.

66. The valve of claim 64, wherein magnets comprises an array of electromagnets that are selectively magnetized to rotate a rotor in sliding contact with the flexible member.

67. The valve of claim 64, wherein the flexible member comprises magnetizable material and further wherein the magnets move the flexible member in rolling contact with the housing surface.

68. The valve of claim 64, wherein the at least one magnet comprises at least one of an electromagnet and permanent magnet.

69. A valve comprising:

a housing having a port;

an actuator movable relative to the housing; and a flexible member disposed between the housing and the actuator, the actuator acting on the flexible member so that the flexible member intermittently seals the port as the actuator moves wherein the flexible member is substantially stationary relative to the housing and is substantially slidable relative to the actuator.

70. The valve of claim 69, wherein the valve is configured as a rotary valve and the actuator is a rotor, wherein the housing has a rotor-facing surface through which the port extends, the rotor-facing surface defining a cone shape.

71. The valve of claim 69, wherein the actuator has a housing-facing surface that is formed with a discontinuity, the discontinuity cooperating with the flexible member to allow the flexible member to move away from the port as the actuator moves and the discontinuity passes over the port.

72. The valve of claim 69, wherein the actuator has a housing-facing surface, the housing-facing surface comprising an undulated surface.

* * * * *